United States Patent
Colon et al.

(10) Patent No.: US 8,467,281 B1
(45) Date of Patent: Jun. 18, 2013

(54) TECHNIQUES FOR IDENTIFYING DEVICES HAVING SLOW RESPONSE TIMES

(75) Inventors: Julio A. Colon, Northbridge, MA (US); Dan Aharoni, Brookline, MA (US); Hagay Dagan, Framingham, MA (US); Gil Ratsaby, Boston, MA (US); Taojun Wu, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 455 days.

(21) Appl. No.: 12/807,943

(22) Filed: Sep. 17, 2010

(51) Int. Cl.
*G11B 7/00* (2006.01)
(52) U.S. Cl.
USPC .............. 369/59.22; 369/53.42; 369/59.21; 369/47.1
(58) Field of Classification Search
None
See application file for complete search history.

(56) References Cited

U.S. PATENT DOCUMENTS

| | | |
|---|---|---|
| 5,544,347 A | 8/1996 | Yanai et al. |
| 5,742,792 A | 4/1998 | Yanai et al. |
| 7,292,969 B1 | 11/2007 | Aharoni et al. |
| 7,392,360 B1 | 6/2008 | Aharoni et al. |
| 7,640,342 B1 | 12/2009 | Aharoni et al. |
| 8,224,630 B2 * | 7/2012 | Das et al. ................ 703/2 |
| 2004/0172506 A1 * | 9/2004 | Gotoh et al. ............ 711/158 |

OTHER PUBLICATIONS

U.S. Appl. No. 10/786,995, filed Feb. 25, 2004 for "System and Method for Simulating Performance of One or More Data Storage Systems With Utilization Input".

* cited by examiner

*Primary Examiner* — Muhammad N Edun
(74) *Attorney, Agent, or Firm* — Muirhead and Saturnelli, LLC

(57) ABSTRACT

Described are techniques for identifying a data storage volume exhibiting a performance problem. First information indicating a sorted ordering of a plurality of maximum response times is displayed for a plurality of data storage volume. A first of the plurality of data storage volumes having a largest one of the plurality of maximum response times is selected. In response to such selecting, additional information is displayed in the user interface about the first data storage volume. The additional information includes at least one workload or performance characteristic of the first data storage volume.

20 Claims, 20 Drawing Sheets

TECHNIQUES FOR IDENTIFYING DEVICES HAVING SLOW RESPONSE TIMES

BACKGROUND

1. Technical Field

This application generally relates to data storage, and more particularly to techniques used in connection with identifying performance problems and potential causes thereof.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices and data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein.

In connection with data storage systems, it may be desirable to utilize an efficient technique that provides for identification of performance problems and assists in identifying potential causes for such problems.

SUMMARY OF THE INVENTION

In accordance with one aspect of the invention is a method for identifying a data storage volume exhibiting a performance problem comprising: displaying, in a user interface, first information for a plurality of data storage volumes, said first information visually indicating a sorted ordering of a plurality of maximum response times, each of said plurality of maximum response times being a maximum response time within a period of time for a different one of said plurality of data storage volumes; selecting, using the user interface, a first of said plurality of data storage volumes having a largest one of the plurality of maximum response times; and displaying, in response to said selecting, additional information in the user interface about said first data storage volume, said additional information including at least one workload or performance characteristic of said first data storage volume. Each of the plurality of maximum response times may be a maximum combined response time for read and write operations directed to one of said plurality of data storage volumes. The maximum combined response time may be a sum of a first response time and a second response time. The first response time may represent the largest response time of all read operations directed to said one data storage volume within said period of time and said second response time may represent the largest response time of all write operations directed to said one data storage volume within said period of time. Each of the plurality of maximum response times may be a maximum response time for read operations directed to a different one of said plurality of data storage volumes. Each of the plurality of maximum response times may be a maximum combined response time for write operations directed to a different one of said plurality of data storage volumes. The user interface may be a graphical user interface and said first information may be displayed as a graph of said plurality of maximum response times in descending order. The method may also include selecting, using the user interface, a first portion of said data storage volumes having maximum response times larger than others of said plurality of data storage volumes not selected; displaying, in response to selecting said first portion, a second portion of said plurality of maximum response times corresponding to said first portion of data storage volumes; and selecting, using the user interface, said first data storage volume from said first portion, said largest one of said plurality of maximum response times being said largest in said second portion. The at least one workload or performance characteristic of said first data storage volume may relate to any of read hits, read misses, write hits, write misses, total I/Os, I/O size, sequential reads, sequential writes, and prefetched data. The method may also include displaying, in the user interface, a utilization map indicating component level utilization of components of a data storage system including said plurality of data storage volumes, said utilization map including a visual indication of a portion of said components used in connection with said first data storage volume. The first data storage volume may be a logical volume and said portion of said components indicated by said visual indication may include at least one front end component and at least one backend component used in connection with said first data storage volume. The portion of said components may include a front end component port, a front end component processor, a front end component board, a back end component port, a back end component processor, and a back end component board. The portion of said components may include one or more physical devices upon which data of said first data storage volume is located and a portion of global memory or cache. The portion may include a plurality of physical devices in accordance with a RAID level of data protection for said first data storage volume. The user interface may be a graphical user interface and said first information may be displayed as a tree map including a plurality of first elements corresponding to physical devices of a data storage system and, within each of said plurality of first elements, a plurality of second elements corresponding to logical data storage volumes, said first data storage volume being one of said logical data storage volumes. Each of the plurality of first elements and each of said plurality of second elements may have a size in accordance with a maximum response time for said time period associated with said each element. Each of the plurality of second elements included in one of said first elements may have a visual indicator indicating a maximum response time for one of said logical data storage volumes having data stored on a physical device corresponding to said one first elements. A first physical device having a largest maximum response time of said physical devices may be included in an uppermost left location in said tree map and a second physical device having a smallest maximum response time of said physical devices may be included in a lowest right location in said tree map.

In accordance with another aspect of the invention is a system comprising: a data storage system having a plurality of data storage volumes; and a computer system including a computer readable medium having code stored thereon for identifying a data storage volume from said plurality of data storage volumes exhibiting a performance problem, the computer readable medium comprising code for: displaying, in a user interface, first information for said plurality of data storage volumes, said first information visually indicating a sorted ordering of a plurality of maximum response times, each of said plurality of maximum response times being a maximum response time within a period of time for a different one of said plurality of data storage volumes; selecting, using the user interface, a first of said plurality of data storage volumes having a largest one of the plurality of maximum response times; and displaying, in response to said selecting, additional information in the user interface about said first data storage volume, said additional information including at least one workload or performance characteristic of said first data storage volume.

In accordance with another aspect of the invention is computer readable medium having code stored thereon for identifying a data storage volume exhibiting a performance problem, the computer readable medium comprising code for: displaying, in a user interface, first information for a plurality of data storage volumes, said first information visually indicating a sorted ordering of a plurality of maximum response times, each of said plurality of maximum response times being a maximum response time within a period of time for a different one of said plurality of data storage volumes; selecting, using the user interface, a first of said plurality of data storage volumes having a largest one of the plurality of maximum response times; and displaying, in response to said selecting, additional information in the user interface about said first data storage volume, said additional information including at least one workload or performance characteristic of said first data storage volume. Each of the plurality of maximum response times may be a maximum combined response time for read and write operations directed to one of said plurality of data storage volumes. The maximum combined response time may be a sum of a first response time and a second response time. The first response time may represent the largest response time of all read operations directed to said one data storage volume within said period of time and the second response time may represent the largest response time of all write operations directed to said one data storage volume within said period of time.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
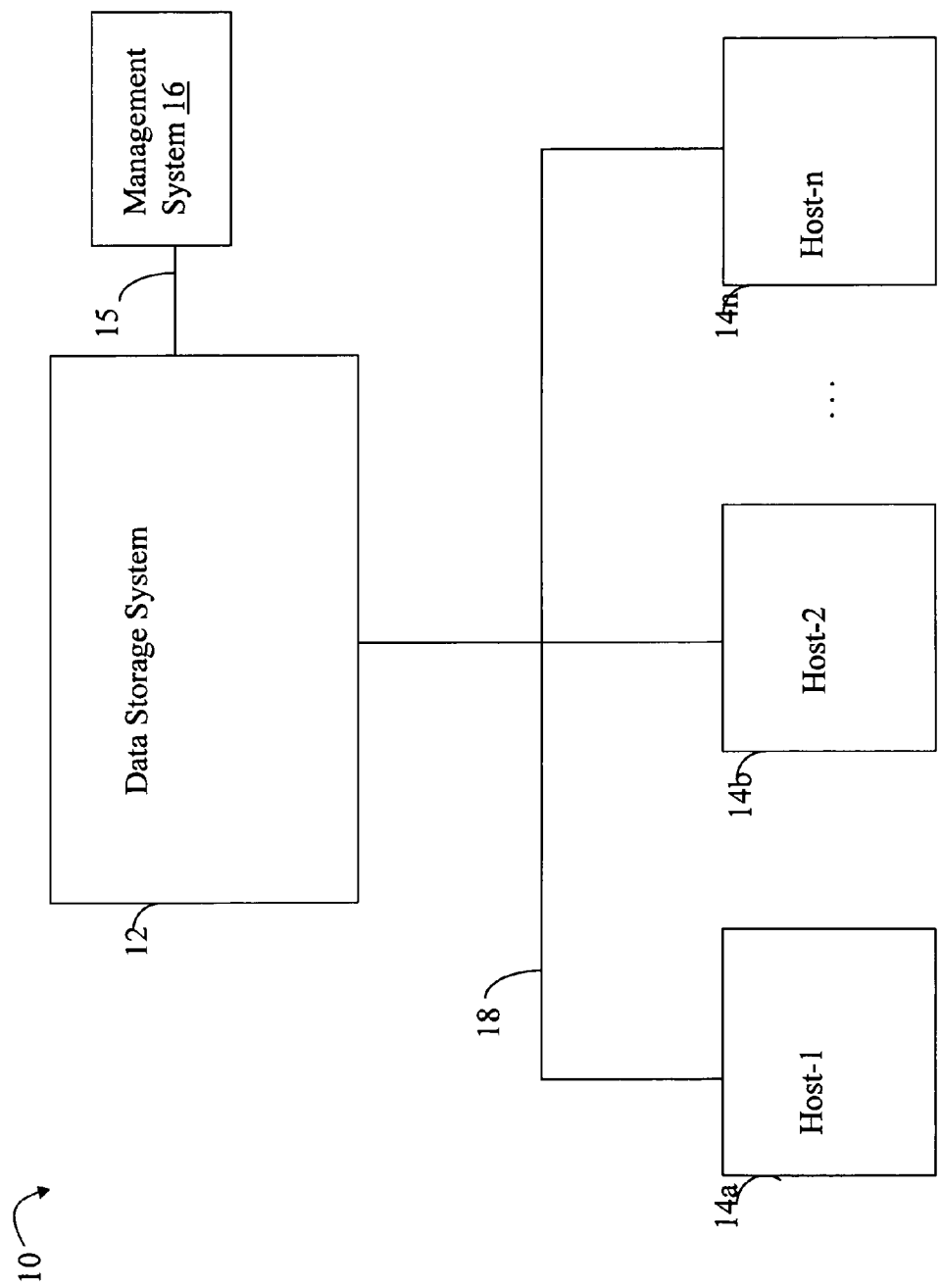
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. The data storage system 12 is also connected to management system 16 through communication medium 15. In this embodiment of the system 10, the N hosts 14a-14n may access the data storage system 12, for example, in performing input/output (I/O) operations or data requests. The communication mediums 15, 18 may be any one or more of a variety of networks or other type of communication connections as known to those skilled in the art. Each of the communication mediums 15, 18 may be a network connection, bus, and/or other type of data link, such as a hardwire or other connections known in the art. For example, the communication mediums 15, 18 may be the Internet, an intranet, network or other wireless or other hardwired connection(s) by which the data storage system 12 communicates with other components such as host systems 14a-14n and the management system 16.

Each of the host systems 14a-14n and the data storage system 12 included in the system 10 may be connected to the communication medium 18 by any one of a variety of connections as may be provided and supported in accordance with the type of communication medium 18. Similarly, the data storage system 12 and management system 16 are also connected to the communication medium 15. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n, management system 16, and data storage system 12 may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, Ficon, SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well one or more other data storage systems as may vary with embodiment. For example, in an embodiment using multiple data storage systems, such as multiple data storage arrays, such data storage systems may be connected to one another and may use techniques such as RDF (Remote Data Facility) by EMC Corporation. In some instances, it may be desirable to copy data from one storage system to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by the Remote Data Facility (RDF) product provided by EMC Corporation of Hopkinton, Mass. Data storage device communication between Symmetrix™ data storage systems using RDF is described, for example, in U.S. Pat. Nos. 5,742,792 and 5,544,347, both of which are incorporated by reference herein. With RDF, a user may denote a first storage device as a master storage device and a second storage device as a slave storage device. Other incarnations of RDF may provide a peer to peer relationship between the local and remote storage devices. The host interacts directly with the local storage device, but any data changes made to the local storage device are automatically provided to a remote storage device using RDF. The local and remote storage devices may be connected by a data link, such as an ESCON link or a Fiber Channel link. The RDF functionality may be facilitated with an RDF adapter (RA) provided at each of the storage devices.

The management system 16 may be used in connection with facilitating collection and analysis of data regarding performance of the data storage system 12 as well as possibly other components. The management system 16 may include code stored and executed thereon to perform processing of the data collected. The particular data collected as well as the processing that may be performed in connection with analysis of the collected data are described in more detail in following paragraphs. The management system 16 may include any one or more different forms of computer-readable media known in the art upon which the code used in connection with the techniques herein is stored. Computer-readable media may include different forms of volatile (e.g., RAM) and non-volatile (e.g., ROM, flash memory, magnetic or optical disks, or tape) storage which may be removable or non-removable.

Figure 2A:
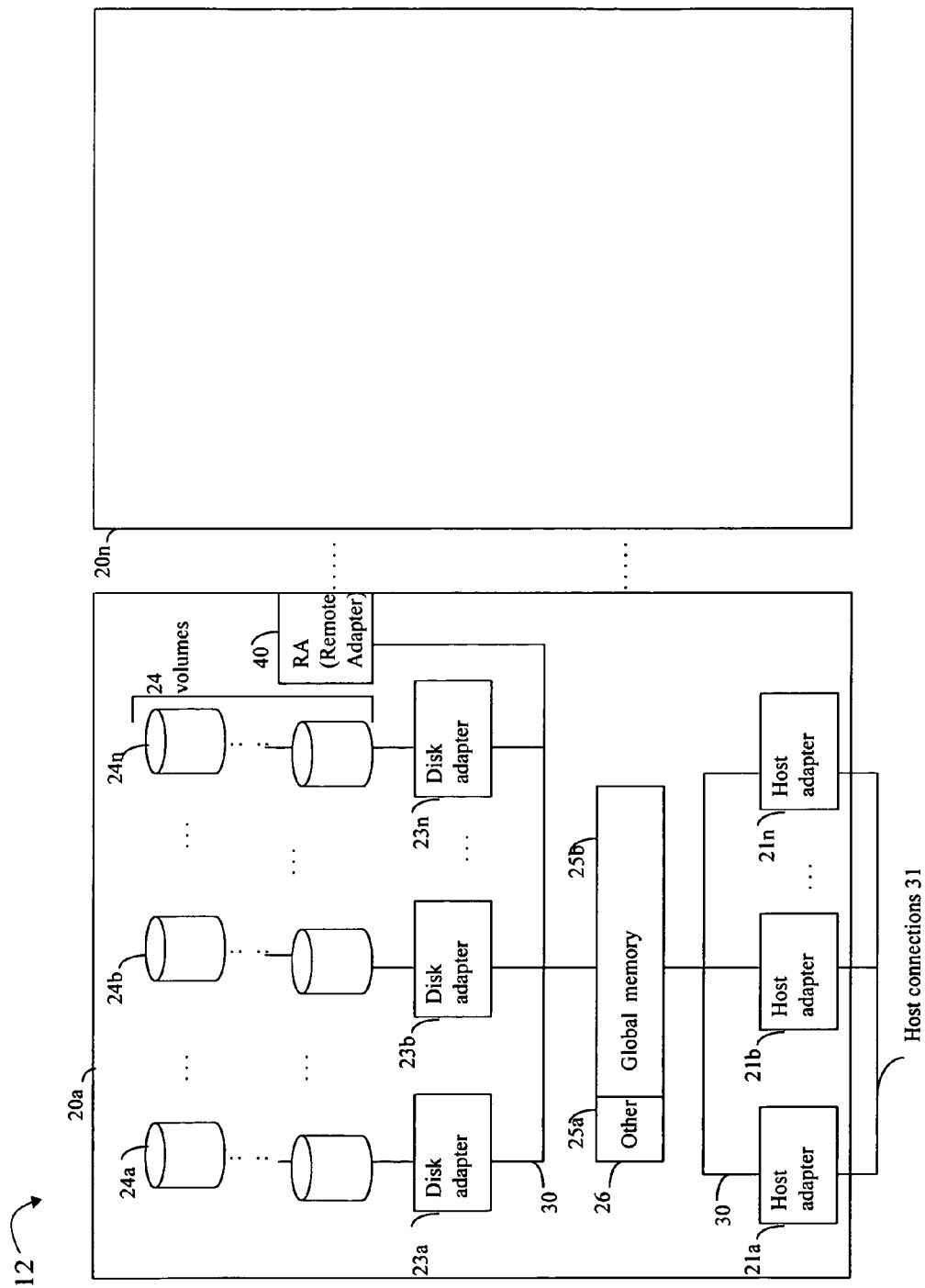
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component, such as a DA, may be characterized as a backend component. In connection with data storage systems such as by EMC Corporation, various types of directors or adapters may be implemented as a processor, or, more generally, a component that includes the processor. Examples of directors are disk adapters (DAs), host adapters (HAs) and the like.

One or more internal logical communication paths may exist between the DAs, the RAs, the HAs, and the memory 26. An embodiment, for example, may use one or more internal busses, fabric, and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. For example, an embodiment in accordance with techniques herein may include multiple storage tiers of solid state storage (SSD) devices, such as flash drives, as well as one or more other storage tiers comprising one or more types of rotating disks. Other types of commercially available data storage systems, as well as processors and hardware controlling access to these particular devices, may also be included in an embodiment.

Also shown in the storage system 20*a* is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual or physical disk drives. For example, one or more LVs may reside on a single physical disk drive. A single LV may also reside on multiple physical drives, for example depending on the RAID protection and layout. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon. A LUN or logical unit number may be characterized as a disk array or data storage system reference to an amount of disk space that has been formatted and allocated for use to one or more hosts. An LV may further map, for example, to a single LUN, more than one LUN, and/or a portion of a LUN.

The DA performs I/O operations on a disk drive. Data residing on an LV may be accessed by the DA following a data request in connection with I/O operations that other directors originate.

Figure 2B:
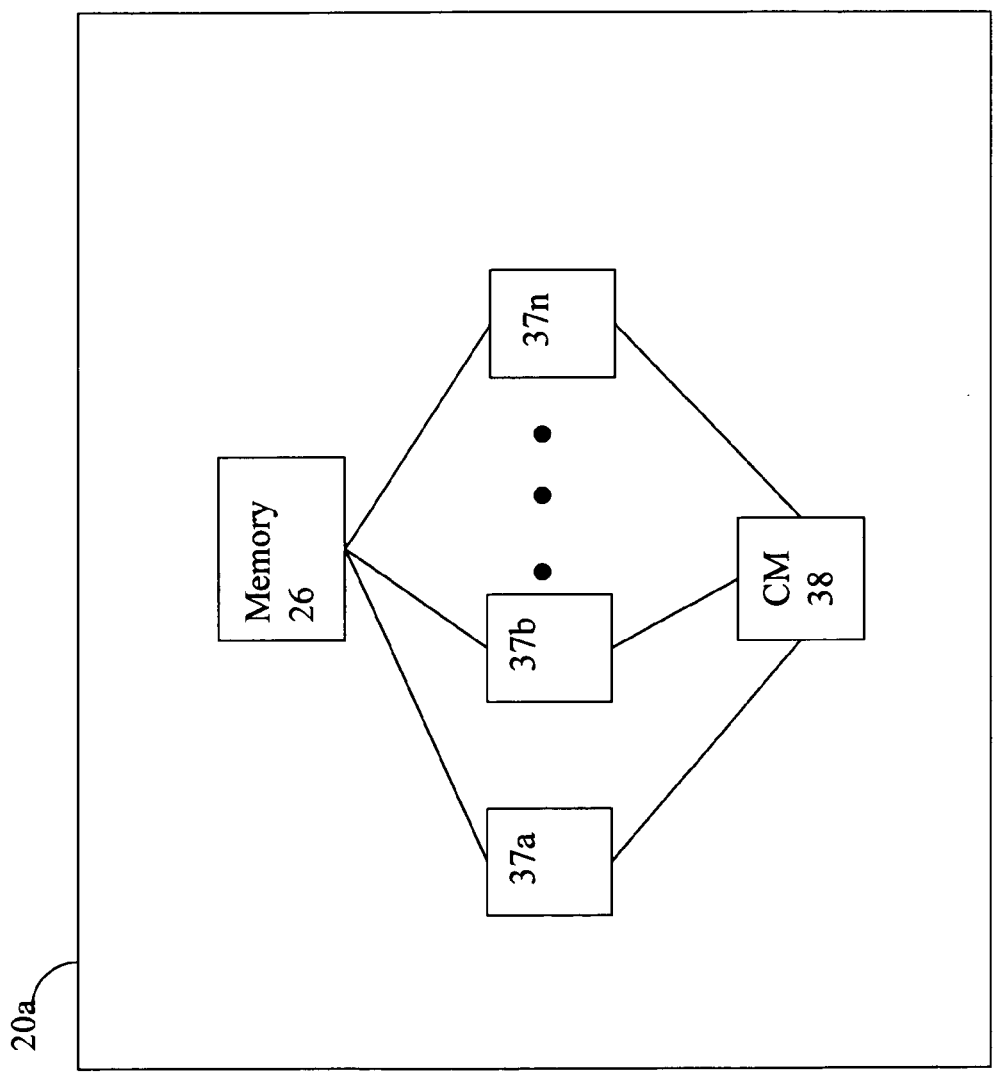
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37*a*-37*n* coupled to the memory 26. Each of the directors 37*a*-37*n* represents one of the HA's, RA's, or DA's that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37*a*-37*n*. Each of the directors 37*a*-37*n* may be coupled to the CM 38 so that any one of the directors 37*a*-37*n* may send a message and/or data to any other one of the directors 37*a*-37*n* without needing to go through the memory 26. The CM 38 may be implemented using conventional MUX/router technology where a sending one of the directors 37*a*-37*n* provides an appropriate address to cause a message and/or data to be received by an intended receiving one of the directors 37*a*-37*n*. In addition, a sending one of the directors 37*a*-37*n* may be able to broadcast a message to all of the other directors 37*a*-37*n* at the same time.

A host may be able to access data, such as stored on an LV of a data storage system, using one or more different physical paths from the host to the data storage system. Described in the following paragraphs are techniques that may be used in connection with selecting a path over which to access data of a storage device when such data is accessible over multiple paths. A host may use such techniques in connection with path selection when communicating data operations, such as I/O operations, to the data storage system.

Each of the data storage systems may include code stored and executed thereon which gathers data regarding performance of the data storage system. The code may report the collected data at various times, for example, to a management system 16 for further analysis. The code may be stored on a form of computer-readable media known in the art as described elsewhere herein. The collected data may be reported to the management system 16 in accordance with a defined polling interval. At defined times, the management system 16 may request the collected data from the data storage system. Using another technique, the data storage system may automatically report the collected data to the management system 16 in accordance with a predefined time interval rather than in response to a request from the management system 16.

Described herein are techniques that may be used in connection with identifying one or more data storage volumes, such as one or more LVs, having performance problems in an efficient and expedient manner. Identification of such storage volumes may be based on response times. For example, such volumes may be identified as the storage volumes having the large response times. The response time for a storage volume may be based on a maximum response time associated with the storage volume for a period of time. The maximum response time may based on response times for read operations, write operations, or both read and write operations directed to the storage volume. After identifying such storage volumes, additional information about the storage volumes may be obtained to provide further insight into identifying potential causes for the performance problems. For example, data storage system components used by the identified storage volumes when processing I/O operations may be examined as a potential source for the performance problem.

One technique for evaluating the gathered data, for example, such as may be reported to the management system by the data storage system 12, may use average counter values determined for a reporting or other defined time period. For example, an average value of a counter may be determined for a polling interval by determining a change in each counter value relative to the change in time since the last set of sample data was obtained. Use of the average values provides information regarding average performance during the elapsed time but does not provide more detailed information about system activity and performance occurring within the polling interval or other period of time for which the averages are determined. For example, if an average response time is computed daily, the average response time reflects an average for the day and does not provide further detail or as to the activity level within the day. If a burst of activity occurs during the day causing the response time during this time to peak and be many times longer than the daily average, such peak response time is not detectable by considering the average daily computed response time. Using techniques herein, the peak or maximum response time may be considered in connection with identifying storage volumes as candidates having performance problems.

In connection with techniques herein, a value that may be determined is event response time. Response time represents the amount of time it takes to complete an event, such as a complete an I/O operation for a received I/O request. Response time may be characterized as including two components: service time and wait time. Service time is the actual amount of time spent servicing or completing the event. The wait time is the amount of time the event, such as the I/O request, spends waiting in line or queue waiting for service (e.g., prior to executing the I/O operation).

Figure 2C:
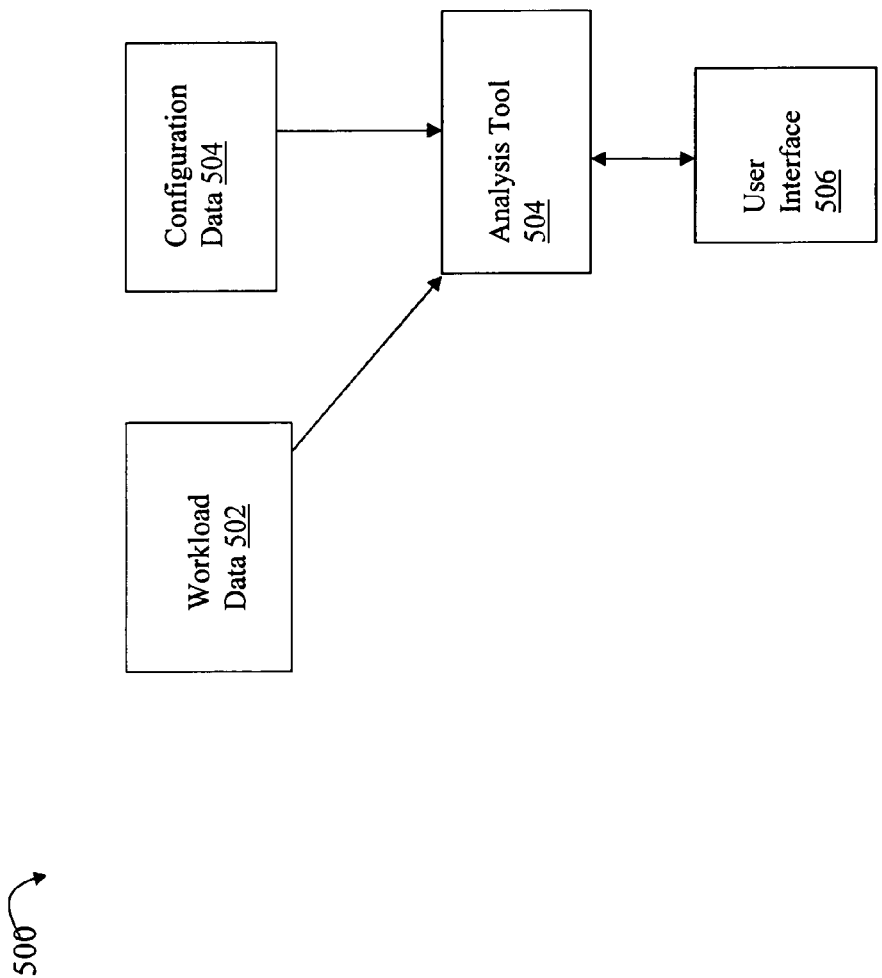
FIG. 2C is an example of software components that may be used in an embodiment in accordance with techniques herein.

Referring to FIG. 2C, shown is an example 500 of software that may be included in a computer system such as management system 16. It should be noted that the management system 16 may be any one of a variety of commercially available processors, such as an Intel-based processor, and the like. Although what is described herein shows details of software that may reside on the management system 16, all or portions of the illustrated components may also reside elsewhere such as, for example, on any of the host systems 14a-14n.

Included on the management system 16 may be workload data 502, configuration data 504, analysis tool 504 and user interface 506. The workload data 502 may be based on performance data gathered about the data storage system 12. The configuration data 504 may include information describing the configuration of the data storage system. For example, the configuration data 504 may identify the different components included in the data storage system (e.g., type and number of physical drives or storage devices, number of DAs, number of FAs, which DAs and FAs (and ports thereof) are used to service I/Os for particular physical devices, which LVs are stored on which physical devices, which is the data protection level (e.g, RAID 1, RAID 5, RAID 6, etc.) for different LVs, and the like. The workload data 502 and configuration data 504 may serve as inputs (alone or in combination with possibly other inputs) to the analysis tool 504. An embodiment of the analysis tool 504 in accordance with techniques herein may determine metrics from the workload data 502 for components of the data storage system and/or LVs described in the configuration data 504. The workload data 502 may be used by the analysis tool 504, for example, in determining a workload for one or more physical devices, logical devices or volumes (LVs) and the like. The workload may be expressed in terms of one or more different performance metrics, for example, in terms of I/O operations (e.g., I/O throughput such as number of I/Os/second, response time, and the like). In accordance with techniques herein, the analysis tool 504 may perform processing used in connection with troubleshooting or identifying data storage system performance problems. The analysis tool 504 may also perform other processing such as, for example, simulation of performance and workload conditions based on a hypothetical change to a data storage system configuration (e.g., modification to the physical storage devices in a configuration such as adding new physical storage devices, removing a physical storage device, or changing a type of storage device, a reconfiguration of what DAs and/or FAs service I/O operations for a particular LV, movement of an LV's data to different physical storage device (s), and the like). It should be noted that the analysis tool 504 may generally perform processing as described herein as well as other processing that may be performed in an embodiment. The analysis tool 504 may interact with a user using user interface 506. In one embodiment, the user interface 506 may be a graphical user interface providing visual indicators such as graphs, maps and other displays, to the user. The user may also make selections and provide input, such as using a keyboard, mouse, or other device of a computer system, based on the displayed information.

Workload such as for an LV or component of the data storage system may be determined using some measure of I/O intensity, performance or activity (e.g., I/O throughput/second, percentage or number of read operations processed in a time period, percentage or number of write operations processed in a time period, read hits, read misses, and the like). Examples of different performance metrics used in characterizing the workload of the data system, one of its components, and the like, are described herein.

Other measurements of how busy an LV or component is may be expressed in other ways. For example, response times and utilization are metrics measuring a level of busyness. The response time as mentioned above may be determined based on workload data collected. In connection with techniques herein, the response times described herein may be determined from the data storage system's perspective as the amount of time measured from when an I/O operation is received by a front end data storage system component, such as an FA, to when the FA has completed servicing the I/O operation (e.g., so that the I/O operation is no longer considered pending or in-progress on the data storage system). One aspect of the techniques herein uses response times based on workload data collected where visualization or display of those response times in graphical form may be used to identify LVs having performance problems as indicated by elevated response times. The response time used in connection with techniques herein may be a maximum or peak response time for a given LV within a time period. It should be noted that for purposes of illustration, an LV or logical volume may be used as the storage entity for which performance problems are detected. However, the techniques herein are more generally applicable for use with other logical and physical data storage entities.

Figure 2D:
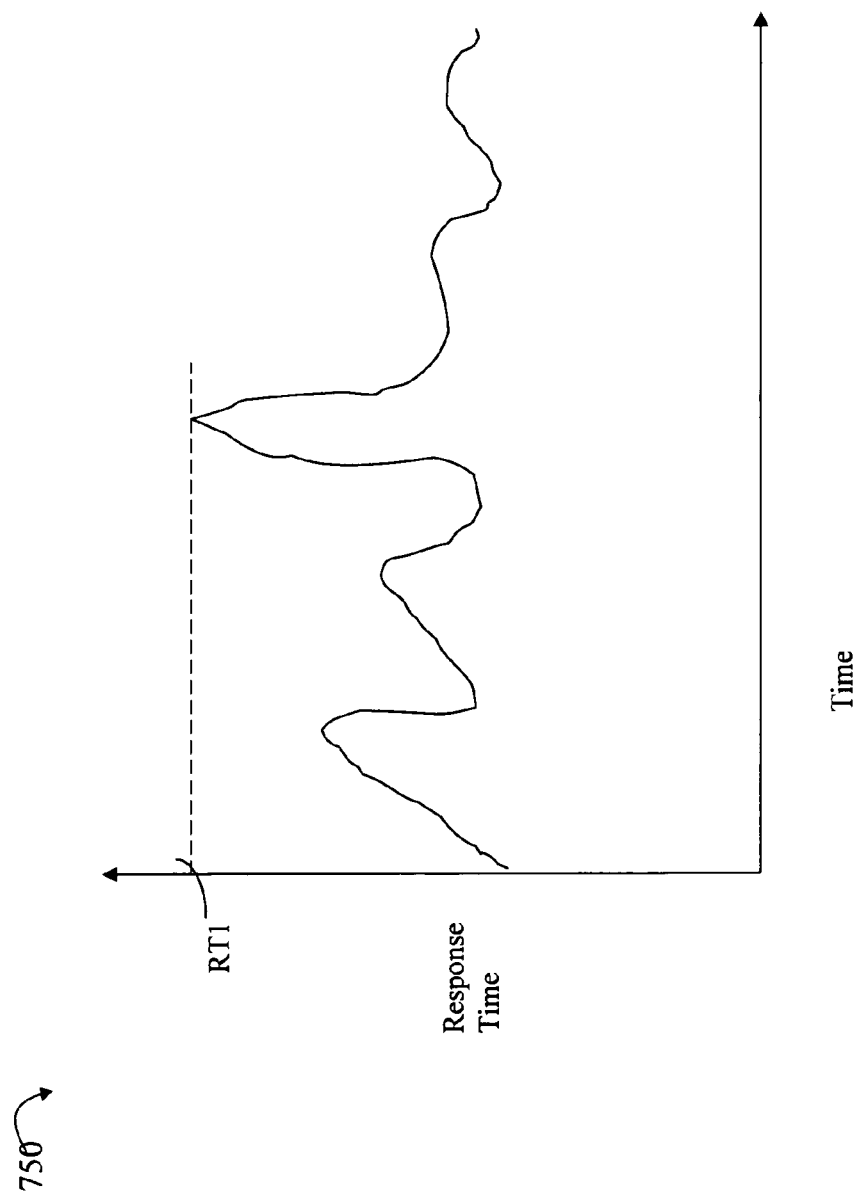
FIG. 2D is an example graphically illustrating a maximum response time value determined and used in accordance with techniques herein.

Referring to FIG. 2D, shown is an example graphically illustrating response times (Y-axis values) that may observed for an LV over a period of time (X-axis values). During the time period, the response time may have a variety of different values as indicated on the Y-axis. The response time may have a peak or maximum value as indicated by RT1 during the indicated time period which may be referred to herein as the MAX RT. Use of the MAX RT for an LV may be used in connection with techniques herein for identifying one or more LVs having performance problems. The MAX RT for an LV may be any one of three different types –MAX read RT, MAX write RT, and MAX combined RT. The MAX write RT for an LV may be the largest or maximum RT for an LV with respect to write I/O operations directed to the device within a time period. The MAX read RT is the largest or maximum RT for an LV with respect to read I/O operations directed to the device within a time period. The MAX combined RT for an LV may be determined as the mathematical sum or the MAX read RT and MAX write RT for a time period and represented as:

$$\text{MAX combined } RT = \text{MAX read } RT + \text{MAX write } RT \quad \text{EQUATION 1}$$

In connection with techniques herein, any one or more of MAX read RT, MAX write RT, and MAX combined RT may be used in connection with identifying LVs having performance problems. An application may be response time sensitive and may care about such worst case conditions or activity bursts as may be associated with one of more of the foregoing MAX RT values. One or more of the foregoing MAX RT metrics a be used in connection with evaluating whether data storage system and associated LV performance is acceptable and, if not, identifying potential bottlenecks and causes thereof. It should be noted that response times may be expressed in milliseconds (ms) or other suitable units of time.

Utilization is another metric that may be used in an embodiment in connection with techniques herein for measuring or quantifying how busy a component in the data storage system is. Utilization may be expressed as a percentage and may refer to the amount of time a component or system is working versus its respective idle time. Utilization may be simulated and is workload dependent. Utilization may be expressed as a function of one or more factors, parameters or variables including any workload performance characteristic or metric and may vary for the particular component. Generally, expected utilization levels for a component given certain conditions may be known such as through prior experimentation and/or vendor supplied information. For example, a component's utilization may be expressed as a function of one or more parameters and the achieved utilization results from values supplied for the one or more parameters. Therefore, utilization may be simulated based on a set of parameters values, such as those which may be based on actual workload data used in measuring the utilization of a component. The factors used in determining utilization may vary with component and its function within a system. Work loads and utilizations do not necessarily behave empirically in a linear manner. For example, if one measures a 60% utilization for a particular workload, adding 10% to this workload may result in a 90% utilization, not 70%, as one might expect. Therefore when analyzing utilization, it is good practice to consider granularity or resolution. The analysis of the utilizations for a given data storage system may be different for different components. In one embodiment in connection with techniques herein, utilization may be used in combination with one or more of the MAX RT values described herein in connection with identifying LVs having performance problems and also in connection with identifying potential sources of such problems.

The analysis tool 504 may be used in determining the workload, utilization, response time, and other information regarding components of the data storage system in accordance with techniques herein.

Figure 3:
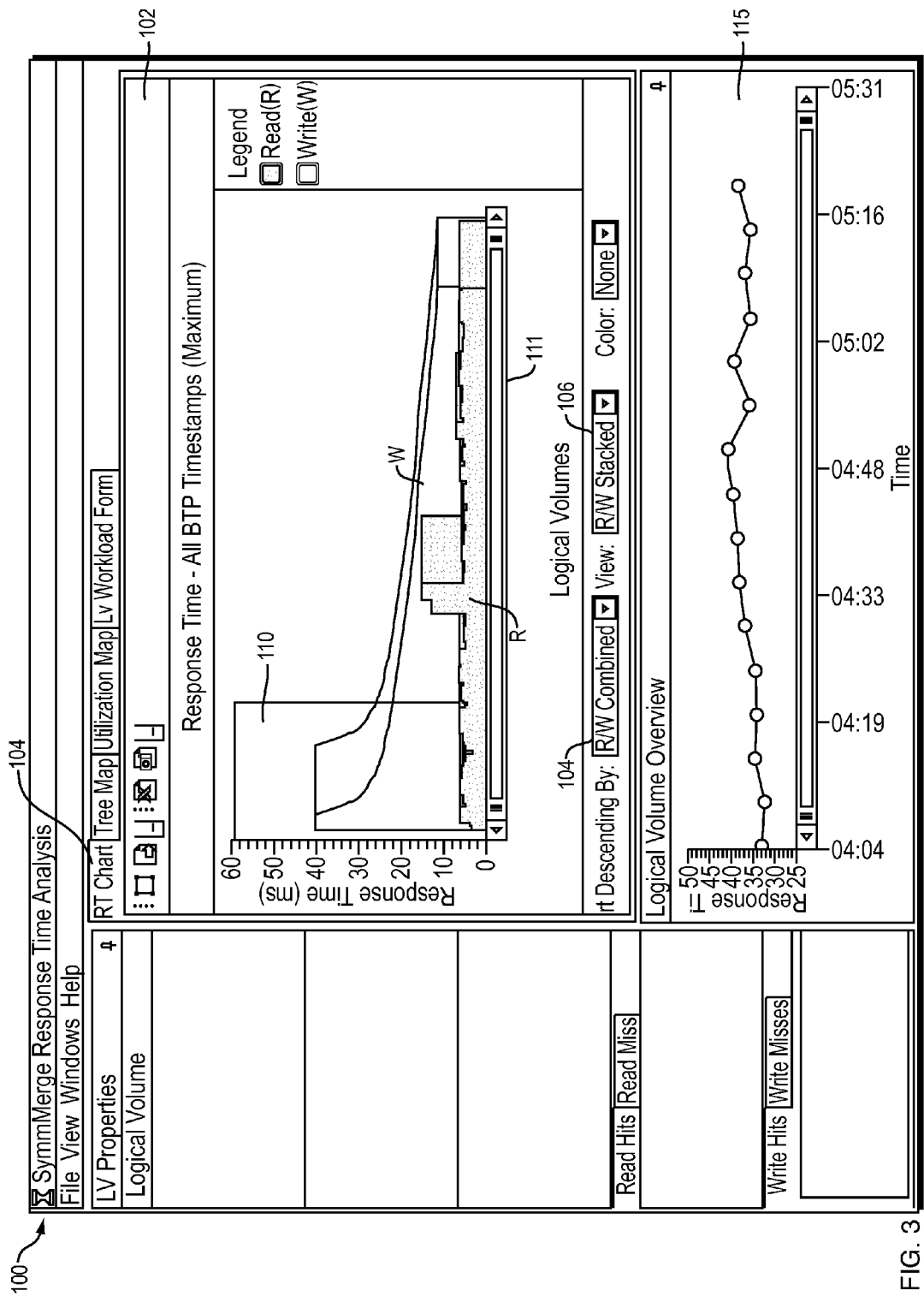
FIGS. 3, 4, 5, 6, 7A, 7B, 8A, 8B, 9A, 9B, 10A and 10B are examples of information that may be displayed in connection with a user interface in accordance with techniques herein.

Referring to FIG. 3, shown is an example of information that may be displayed in a user interface of the analysis tool in connection with identifying data storage system performance problems. The example 100 includes a portion 102 providing a graphical display of MAX combined RT values for LVs in the data storage system when tab 104 is selected. The MAX combined RT values may be determined with respect to a period of time over which response times are determined. For example, for a given LV, a response time may be determined for each point in time in a defined period. As described elsewhere herein, the maximum of such response times with respect to only read operations may be the MAX read RT and the maximum of such response times with respect to only write operations may be the MAX write RT. In the user interface, selection of one of the MAX RT metrics (e.g., selection of MAX combined RT, MAX write RT or MAX read RT) may be made using control 104. In this example, the MAX combined RT is the selected metric. In portion 102 of the display, the MAX combined RT values for LVs in the data storage system may be presented in a stacked or combined view for each LV. Such a stacked view may be selected using control 106. In the stacked view of 102, it may be seen that, for a given LV denoted on the X axis, the LV's MAX write RT is "stacked" on top of the LV's MAX read RT. In portion 102, it should be noted that the MAX combined RT values for the LVs may be sorted in descending order providing for ease in identifying visually those LVs having the largest MAX combined RT values.

Portion 115 of the display graphically illustrates the maximum response times (Y-axis values) determined across the data storage system for all LVs and for all I/Os within a time period represented by the span of time on the X-axis.

In accordance with techniques herein and as illustrated in FIG. 3, provided is a visualization of the MAX combined RT values for the LVs where such visualization may be used to easily identify LVs having performance problems as indicated by the largest of the displayed MAX combined RT values. The visual indication provided by the graphical display of the sorted MAX combined RT values may be used to easily identify the LVs having the largest such RT values. In response to displaying FIG. 3, a user may select through the user interface one or more LVs for further examination and evaluation. For example, a user may select, such as using a mouse or other input selection device, a portion of the LVs represented by 110 having the largest MAX combined RT values. In one embodiment, the user may draw a rectangular region 110 within area 102 to select the corresponding LVs associated with the Y-axis 111.

The display of FIG. 3 may be viewed to first determine whether the largest MAX combined RT value of all LVs appears to be a problem. If so, user interface interactions and selections may be performed in connection with troubleshooting or problem analysis to try and determine why the LV is experiencing such a high MAX combined RT, such as by drilling down or focusing on the particular LV and obtaining additional information about the LVs performance, workload, and the like.

Figure 4:
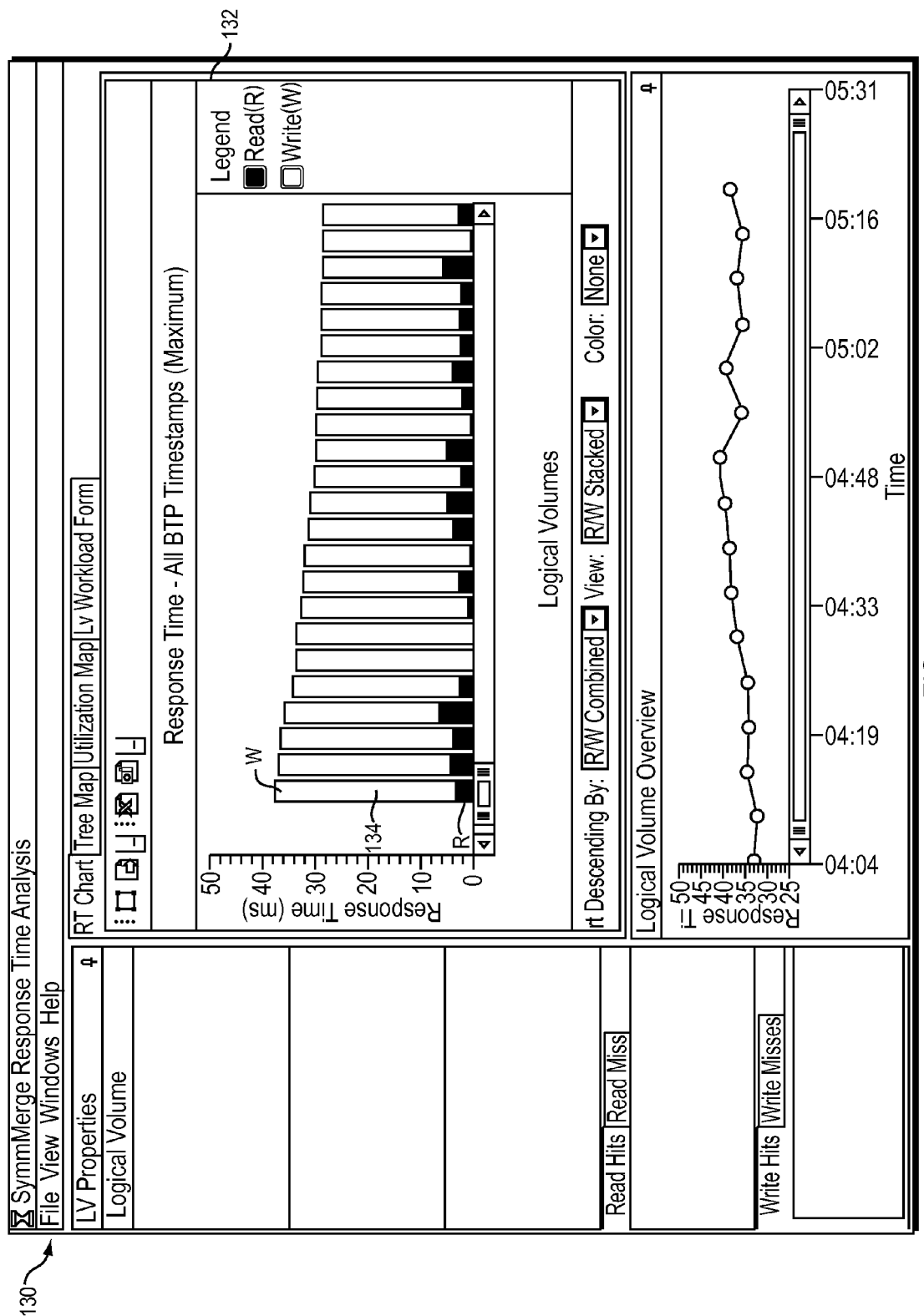

In response to selection of the LVs represented by 110, the example of FIG. 4 may be displayed.

Referring to FIG. 4, shown is an example 130 providing a more detailed view of the MAX combined RT values for the selected LVs associated with the selection 110. The selected LVs have the largest such RT values of all LVs in the data storage system. A single LV of those having information displayed may be selected, such as represented by 134, using a mouse or other device. The LV represented by 134 indicates the LV having the largest MAX combined RT value of all LVs in the data storage system.

Figure 5:
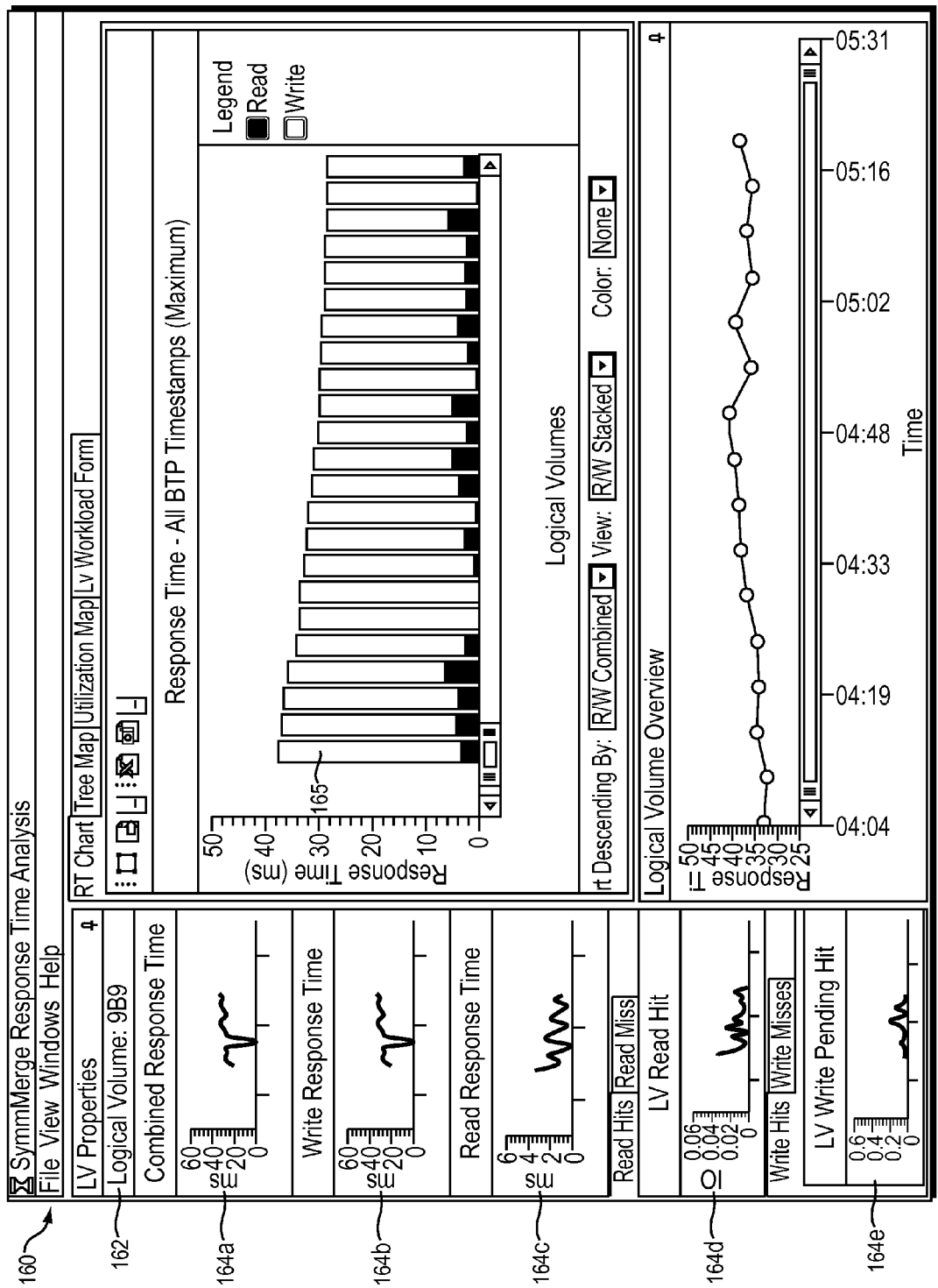

In response to selection of the LV represented by 134, the example of FIG. 5 may be displayed to provide additional information about the LV. Such information about the selected LV may include that which is displayed in areas 162 and 164a-164e and may provide additional insight about the LV regarding its performance and workload. Such information may be part of a drill down process to focus on determining potential cause(s) of the elevated MAX combined RT value, to determine whether the MAX combined RT value for the LV is an infrequent or isolated occurrence, and the like. Element 162 provides an LV reference or identifier. Element 164a provides a graphical display of a combined RT for read and write operations at different points in time. In this case, the combined RT at a point in time represents the mathematical sum of the RT for read operations and RT for write operations. Element 164b represents the RT determined for only write operations at different points in time in the observed time period. Element 164c illustrates the RT determined for only read operations at different points in time in the observed time period. Element 164d illustrates the number of read hits for the LV at different points in time. It should be noted that the display of 164d may also selected to provide information on read misses for the LV. An LV read hit is experienced with a read I/O operation directed to the LV is serviced from cache. In contrast, an LV read miss is experienced with the read operation cannot be serviced from cache (e.g., read operation results in a cache miss in that all the requested data is not in cache and thus requires retrieval from a physical device). In an embodiment of a data storage system described herein, read operations are serviced using data from cache. If the data is not in cache at the time of the requested read operation, the data may first be retrieved from the physical device and placed in cache prior to servicing the read operation. Element 164e illustrates the number of write hits experienced for write operations directed to the LV. A write hit or LV write pending hit is experienced if a write request is received and there is write pending cache entry containing a current version of the data which is to be overwritten. Otherwise, if such a cache entry does not exist, the write operation may be categorized as a write miss. It should be noted that the display of 164e may also selected to provide information on write misses for the LV.

With reference to the example of FIG. 5, it may be seen that the MAX write RT for the selected LV of 162 may be about 35 or 36 ms (milliseconds). From further review of the additional information of 164a and 164b, it may seen that the MAX write RT is not a single or infrequent peak value. Rather, for example, 164a indicates that values at or near the MAX combined RT occurs many times within or over the time period displayed. Furthermore, based on the displayed information, it may be determined that the read RT does not seem to be a problem (e.g., not too large) but rather the write RT values seem to be elevated.

Figure 6:
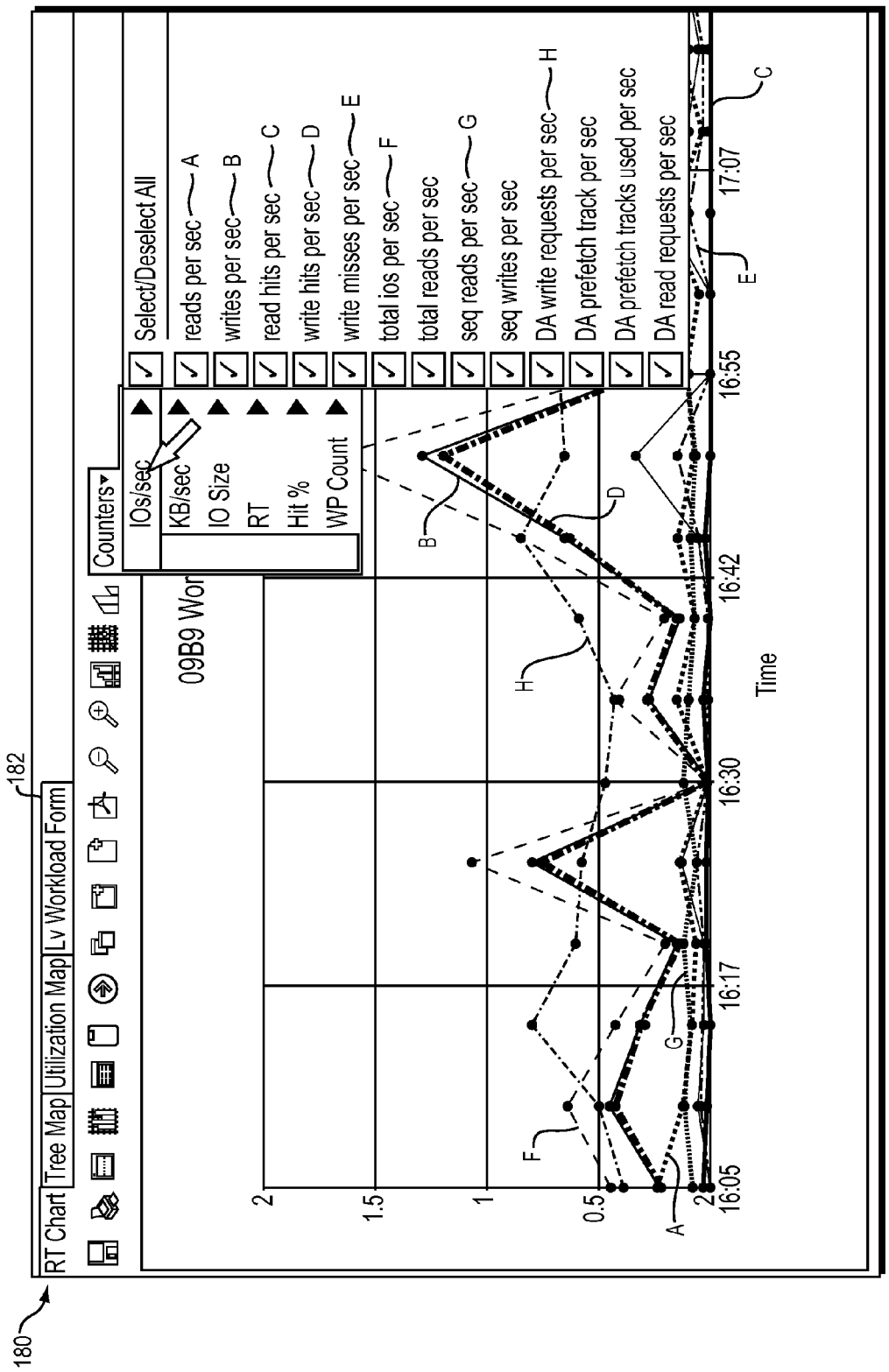

In addition to the information of the selected LV provided by FIG. 5, it may be desirable to further view other workload information about the LV such as illustrated in FIG. 6.

In FIG. 6, shown is an example of additional workload information that may be displayed for a currently selected LV (e.g., LV identified in 162 of FIG. 5). The additional workload information may be displayed in response to selecting the LV Workload Form tab 182. It should be noted that the LV Workload Form and information of FIG. 6 may be displayed in response to other selections or actions with respect to an LV. For example, with reference back to FIG. 5, right clicking on the bar 165 or over the area of 162 may result in display of FIG. 6.

The example 180 provides a graphical display of various counters or metrics associated with I/Os per second such as reads per second, writes per second, read hits per second, write hits per second, write misses per second, write misses per second, total IOs/second (e.g., considering both read and write operations), total reads/second, sequential reads/second, sequential writes/second, DA write requests/second (e.g., the number of pending writes destaged by a DA per second), DA prefetched tracks/second, DA prefetched tracks used/second, and DA read requests/second. In connection with the foregoing, sequential reads refers to a situation where a read request following an immediate preceding request is for data stored on disk in an immediately following sequence such as a data block. In such a case, cache can be used quite effectively to avoid going to disk, e.g., by prefetching a certain amount of sequentially arranged data from disk into cache. Similarly, a sequential write refers to a sequence of write operations with respect to sequentially located data. Write Pending writes (WP writes) refer to writes which are written into write pending (WP) slots in cache, which enable a more efficient write operation in terms of resource usage. An example of WP writes are cases where the same address in written and re-written a number of times over and over.

In a manner similar to that as illustrated in FIG. 6, there may be other counters and metrics available for display such as related to KB/second or amounts of data processed within a time period, I/O size (e.g. indicating whether I/O operations are for relatively large or small amounts of data), cache hit metrics in terms of percentages, additional information regarding a number of pending writes for the LV at various points in time, and the like. Such additional information may be used in determining possible causes for any large response times experienced for the LV. For example, having a relatively large number of writes pending (e.g., above a threshold number) for the LV may indicate that additional cache may be needed or a reallocation of existing cache for use with write operations.

It should be noted that an embodiment may also provide for additional and/or different information than as described herein for an LV. For example, an embodiment may provide further information about the RT such as a further breakdown regarding the RT time (e.g., a portion of the RT spent on RDF (remote links), for reads, portion of time spent in the front end, back-end, and the like.

It should also be noted that although the RT and utilization are related, there may be instances where utilization will be simulated as a low utilization because of relatively low workload. However, the RT may be high, for example, if there is problem with code executing on the data storage system causing a slow response for servicing I/Os.

Figure 7A:
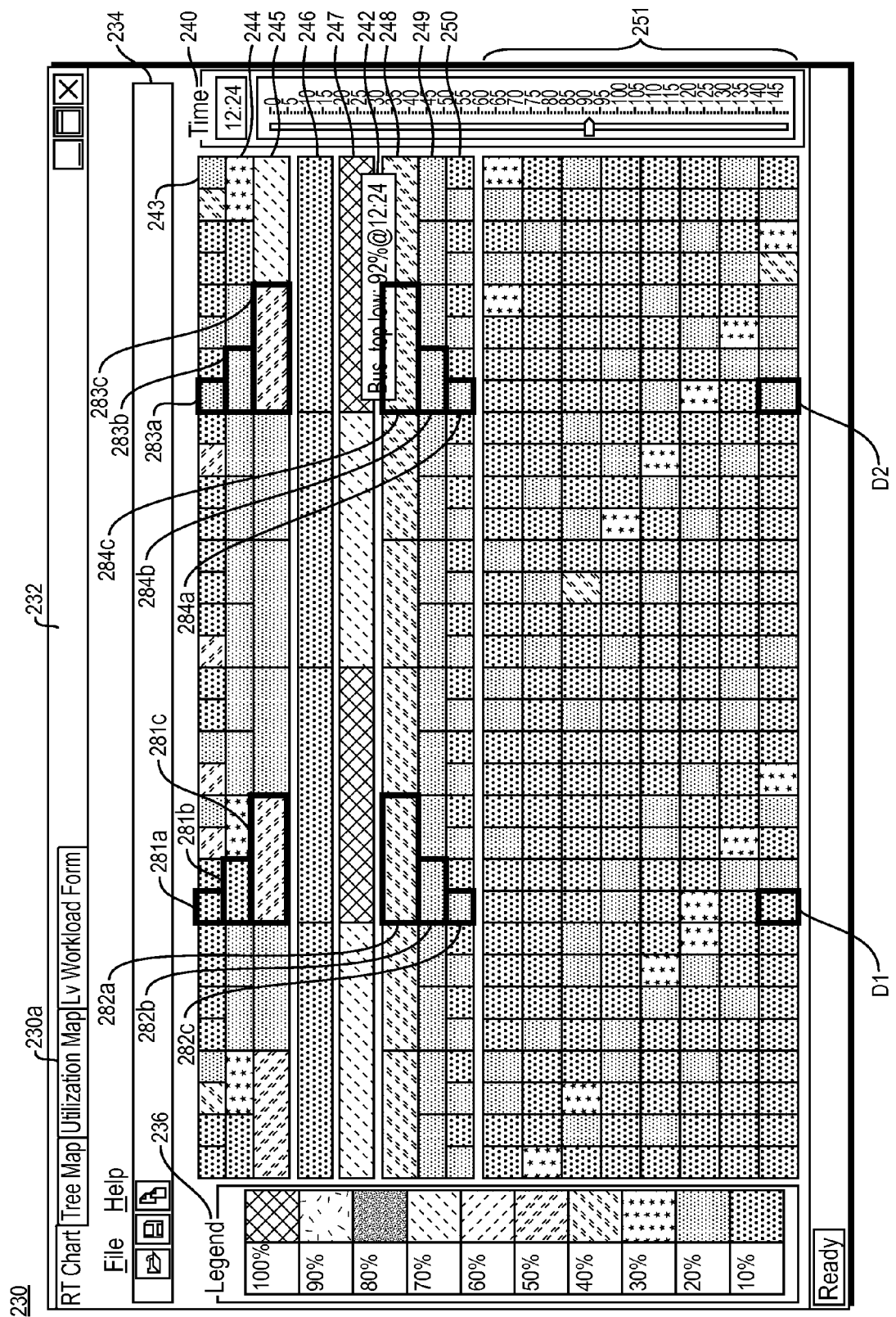
Figure 7B:
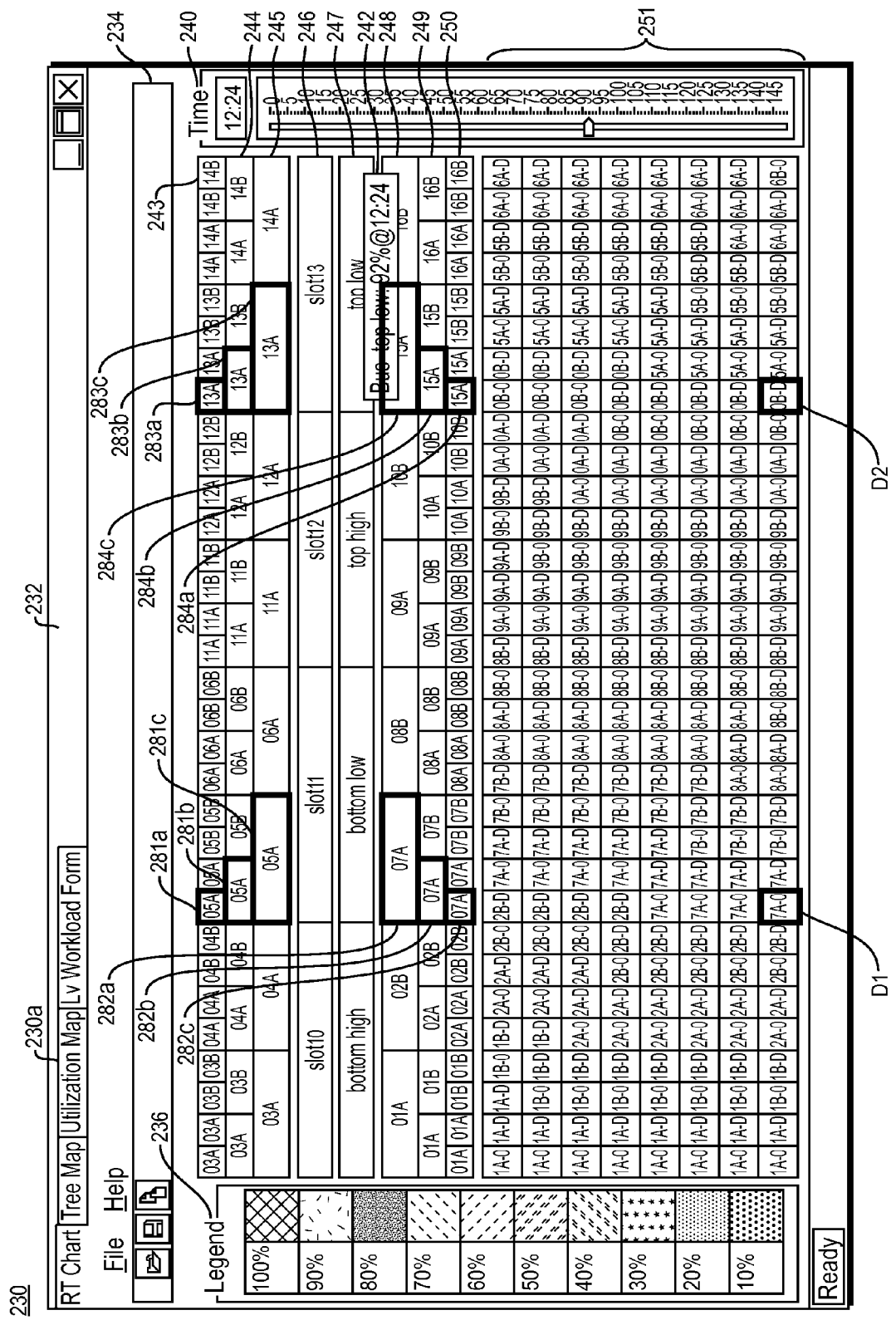
Figure 8A:
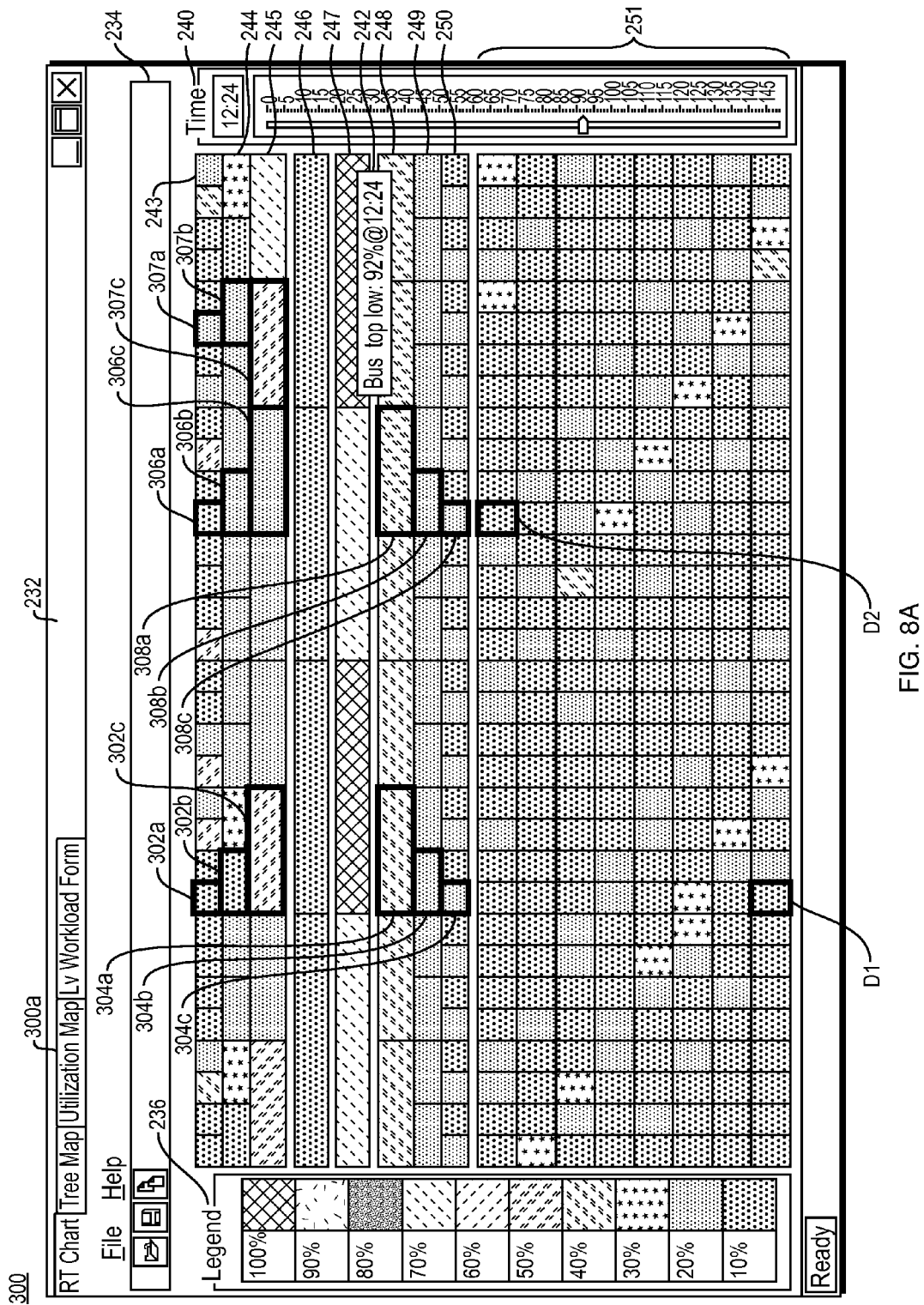
Figure 8B:
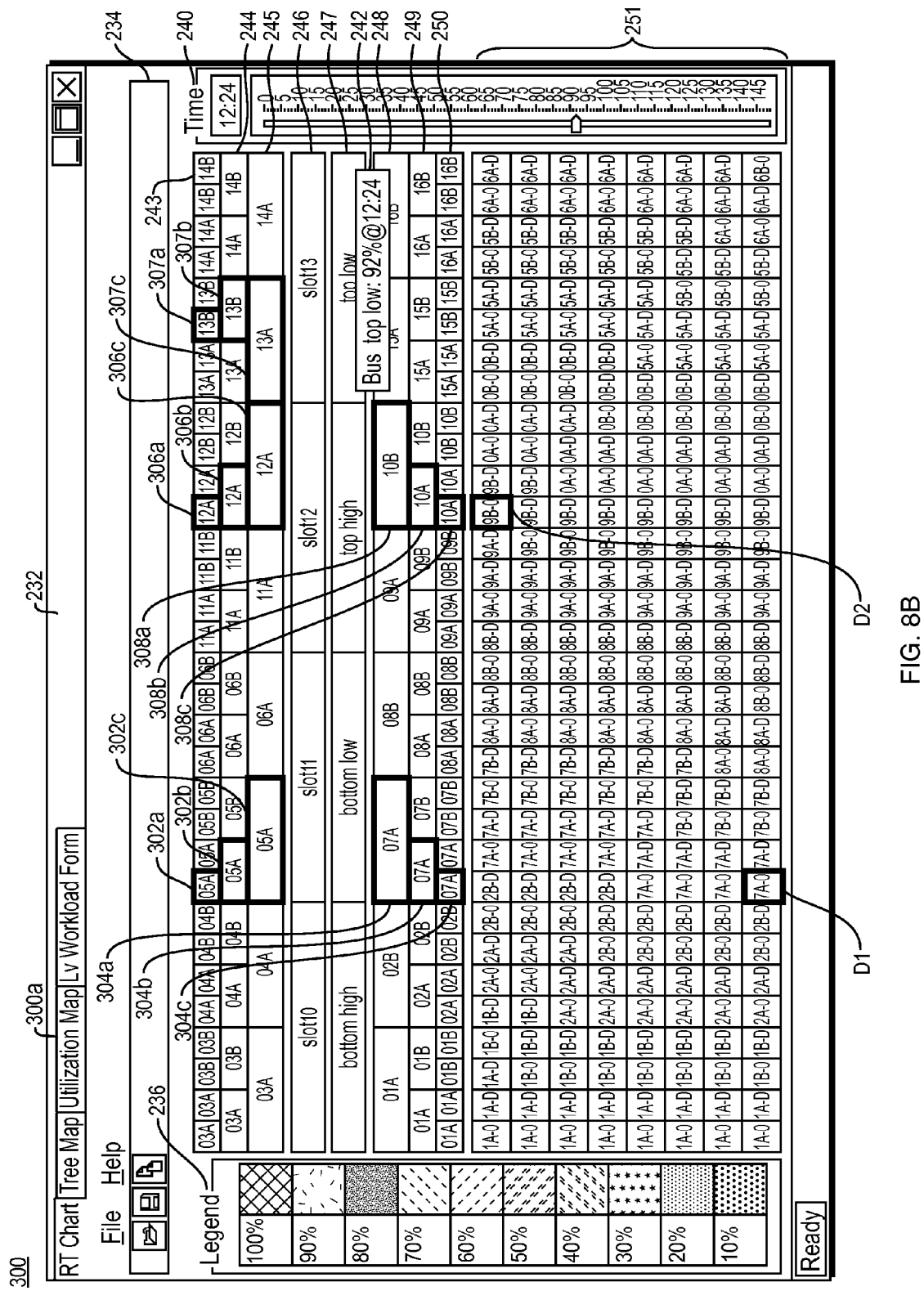

An embodiment may also provide for the display of utilization information for the selected LV. In one embodiment with reference to FIGS. 7A and 7B, the utilization information may be displayed in response to a user selection such as by selecting tab 230a. In actual implementation information in FIGS. 7A and 7B is combined into a single display such that the information of FIG. 7A illustrating shading is overlayed or viewed in combination with the text of FIG. 7B in commonly denoted portions to view the utilization information. In a similar manner to that as described for FIGS. 7A and 7B, in actual implementation, information in FIGS. 8A and 8B is combined into a single display such that the information of FIG. 8A illustrating shading is overlayed or viewed in combination with the text of FIG. 8B in commonly denoted portions to view the utilization information. FIGS. 7A and 7B show a component analysis map screen 230 of an entire data storage system. The tool 504 may enable a user to view utilization of each component in a data storage system. The tool may provide the user with an option to view the utilization information in a map format as illustrated in FIGS. 7A, 7B and 8A, 8B as well as possibly other forms through the user interface. The mapped view of FIGS. 7A and 7B represents the maximum utilization of each component over all the timestamps (e.g. for an entire period of time) or per a particular timestamp (i.e. point in time). A title area 232 and action menu bar area 234 serve to respectively inform and allow the user to interact in conventional ways of Windows based software. The mapped view presents a way for a user to explore the utilization and potential problems of a data storage system. Area 238 generally shows the utilization of each component in accordance with a legend of different visual indicators associated with different utilization percentages such as indicated by legend 236. For example, different components may be color coded in accordance with different colors associated with different utilization percentages (e.g. using red to identify over-used components (shown here in FIG. 7A as graphically coded due to lack of color drawings used herein). A timestamp area 240 allows the user to look at usage over any selected time.

Generally, regarding identification of components in the presented window of screen 230, the following applies for this example. Presented from top to bottom on screen 230 are:

area 243: front-end ports;
area 244: front-end CPUs;
area 245: front-end boards (i.e. the components on board to the bus;)
area 246: memory or cache boards;
area 247: buses or fabric;

area 248: back-end boards;
area 249: back-end CPUs;
area 250 back-end ports; and
area 251: physical devices such as physical disks identified by physical volume id's.

In connection with the foregoing, front end ports, boards and CPUs may refer to a front end component of the data storage system such as an FA which receives I/Os from the host. Back end ports, boards, and CPUs may refer to those of a back end component such as a DA.

In connection with techniques herein for the currently selected LV, the utilization map may visually indicate one or more data storage system components used in connection with servicing I/O operations for the selected LV. For example, elements 281*a*, 281*b*, 281*c*, 282*a*, 282*b*, 282*c*, 283*a*, 283*b*, 283*c*, 284*a*, 284*b*, 284*c* and D1 and D2 may be displayed to visually indicate such components for the selected LV. In this case, the LV may be a logical storage volume for which a level of data protection is enabled. In this case, RAID-1 or mirroring is performed for the selected LV so that D1 denotes a first physical device upon which the LV data is stored and such data is mirrored on a second physical device denoted by D2. This LV is configured to have access through two front end or FA ports and two DA or backend ports. Elements 282*c*, 282*b*, and 282*a* may denote, respectively, the first DA port, DA CPU and DA board used in connection with servicing I/O operations for the selected LV. Elements 284*a*, 284*b*, and 284*c* may denote, respectively, the second DA port, DA CPU and DA board used in connection with servicing I/O operations for the selected LV. Elements 281*a*, 281*b* and 281*c* may denote, respectively, the first FA port, FA CPU and FA board used in connection with servicing I/O operations for the selected LV. Elements 283*a*, 283*b* and 283*c* may denote, respectively, the second FA port, FA CPU and FA board used in connection with servicing I/O operations for the selected LV.

This example is an exemplary case of an EMC Symmetrix Data Storage System. However, one skilled in the art will recognize the general mapping scheme and components may apply to any data storage system other than the exemplary case.

Returning to FIGS. 7A and 7B, when a mouse cursor is moved over a component screen representation (e.g. example component screen representation 242 in general screen area 247), the utilization is shown presented on the screen for the user to read. In the present example, the Bus-top low component: is being used at 92% utilization at the time 12:24. This implies alarmingly high traffic and alerts a user of potential problem areas to address for the target or current system. It should be understood, that generally additional text messages and information of different type may also be displayed in response to such cursor movement. It should also be noted that the display of FIGS. 7A and 7B in an embodiment may further annotated with additional information for the selected LV and its associated components. For example, with respect to those components identified by D1, D2, 281*a-c*, 282*a-c*, 283*a-c* and 284*a-c*, additional information such as described above in connection with element 242 may automatically be displayed in response to selection of tab 230*a*. In other words, rather than have such information displayed in response to movement of the mouse cursor, such information may automatically be included in the display for those components of D1, D2, 281*a-c*, 282*a-c*, 283*a-c* and 284*a-c* for the selected LV.

Additionally and more generally, a user may be able to draw many conclusions by viewing the map of FIGS. 7A and 7B. For example, many disk drives, e.g. Drive 1A-0 are being under-utilized, 10% in the example, while others, e.g. Drive 9A-0 are being used at a good rate of about 40%. Thus, the map view of FIGS. 7A and 7B is also generally useful for determining utilization of each component in a system.

Referring to FIGS. 8A and 8B, shown is another example illustrating use of the utilization map in connection with a selected LV in accordance with techniques herein. The map of the example 300 of FIGS. 8A and 8B is similar to that as described above in connection with FIGS. 7A and 7B. As in the previous FIGS. 7A and 7B, in this example, the LV may be a volume for which a level of data protection is enabled. In this case, RAID-1 or mirroring is performed for the selected LV so that D1 denotes a first physical device upon which the LV data is stored and such data is mirrored on a second physical device denoted by D2. In the example of FIGS. 8A and 8B, three FA ports and associated components are designated as servicing the LV rather than 2 FA ports and associated components as illustrated in FIGS. 7A and 7B.

In connection with techniques herein for the currently selected LV, the utilization map of FIGS. 8A and 8B may visually indicate one or more data storage system components used in connection with servicing I/O operations for the selected LV. For example, elements 302*a-c*, 304*a-c*, 306*a-c*, 308*a-c*, and D1 and D2 may be displayed to visually indicate such components for the selected LV. Elements 304*c*, 304*b*, and 304*a* may denote, respectively, the DA port, DA CPU and DA board used in connection with servicing I/O operations for the selected LV when using the mirrored copy of the data stored on physical device D1. Elements 302*a*, 302*b* and 302*c* may denote, respectively, the FA port, FA CPU and FA board used in connection with servicing I/O operations for the selected LV when using the mirrored copy of the data stored on physical device D1. Elements 308*c*, 308*b*, and 308*a* may denote, respectively, the DA port, DA CPU and DA board used in connection with servicing I/O operations for the selected LV when using the mirrored copy of the data stored on physical device D2. Elements 306*a*, 306*b* and 306*c* may denote, respectively, the FA port, FA CPU and FA board used in connection with servicing I/O operations for the selected LV when using the mirrored copy of the data stored on physical device D2. Elements 307*a*, 307*b*, and 307*c* may denote, respectively, the third FA port, FA CPU and FA board used in connection with servicing I/O operations for the selected LV.

In a similar manner to that as described above in connection with FIGS. 7A, 7B and 8A, 8B, different and/or additional components may be visually indicated for a particular LV in accordance with the data protection of RAID level associated with the LV as well as other particulars of an embodiment that may vary with LV. For example, an embodiment may also highlight fabric or bus components (247), and/or global memory or cache components (246).

What will now be described is a different way in which the response time information for the data storage system LVs, such as any of the MAX RTs described above, may be viewed to provide a visual indication as to which LVs have the largest such MAX RT values for a time period or a selected instance of time within the time period.

Figures 9A, 9B:
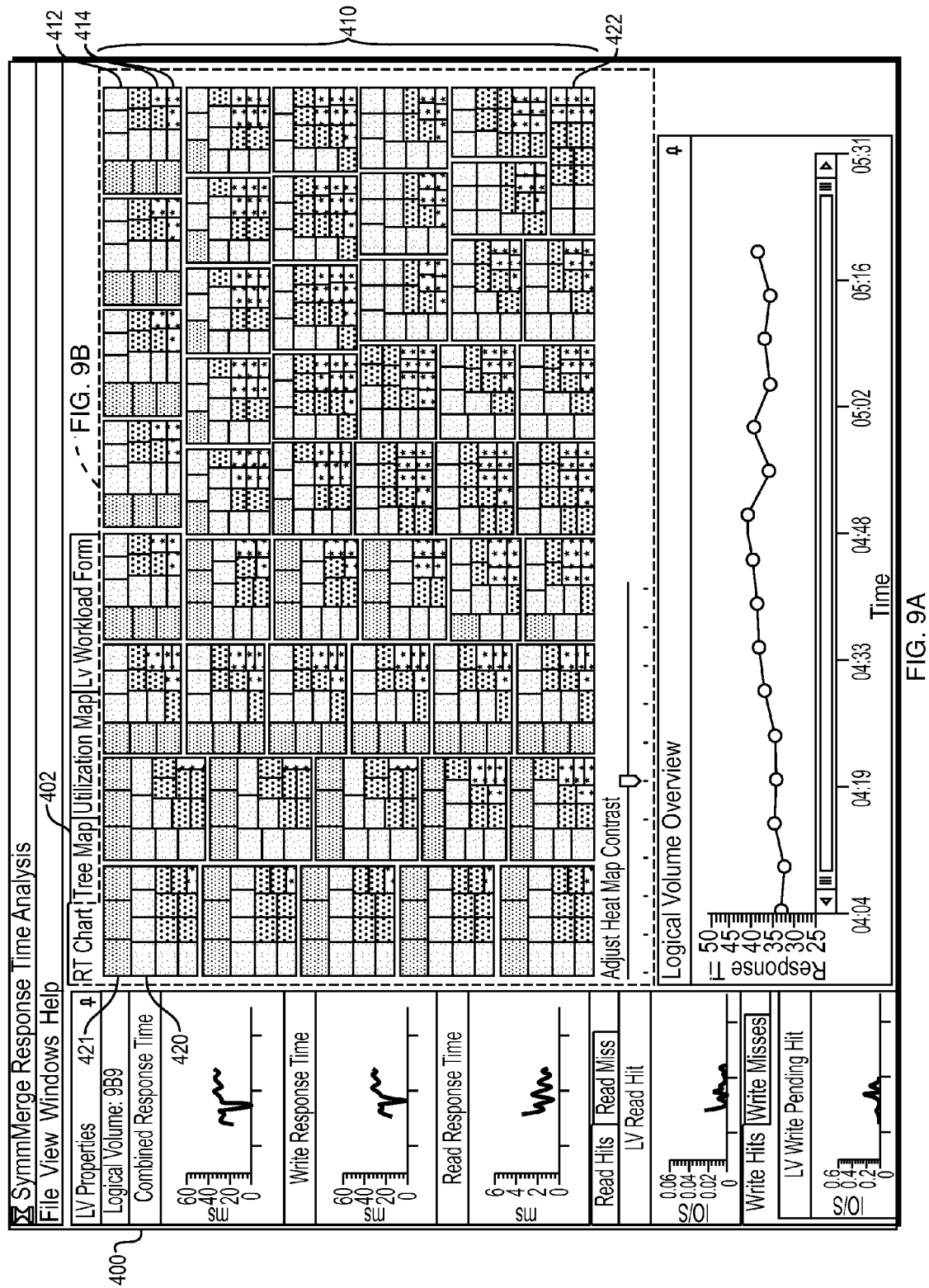

Referring to FIGS. 9A and 9B, shown is an example of information that may be displayed in response to selecting tab 402 for a tree map in connection with techniques herein. FIGS. 9A and 9B illustrate a tree map in area 410 using the data of the MAX combined RT values for the LYS as described above and illustrated, for example, in connection with FIG. 3. FIG. 9A includes an area which is denoted by a dashed line and labeled as FIG. 9B. The foregoing area of FIG. 9A includes smaller shaded portions therein having associated text which is included in FIG. 9B and which overlays the shaded portions of the area of FIG. 9A. In actual implementation, information in FIGS. 9A and 9B is combined into a single display such that the information of FIG. 9A illustrating shading is overlayed or viewed in combination with the text of FIG. 9B in commonly denoted portions to view the tree map.

It should be noted that although the tree map uses the MAX combined RT values, the tree map may also be used in connection with other metrics, such as other variations of the RT (e.g., MAX write RT, average RT for a time period, and the like).

A tree map provides for visualization of a hierarchical structure or organization of data. In connection with techniques herein, the tree map includes a plurality of larger boxes such as 412 where each such larger box corresponds to a physical storage device. Within each larger box are a plurality of smaller boxes, such as denoted by 414 within element 412. Each such smaller box within a larger box denotes an LV having data stored on the physical device represented by the larger box. For example, element 414 denotes two LVs having data stored on the physical device represented by element 412. The numeric value in each of the smaller boxes denotes the MAX combined RT value for the LV represented by the smaller box. If an LV spans multiple physical devices, a MAX combined RT value may be determined and represented in each of the larger boxes corresponding to those multiple physical devices.

With respect to those elements of the tree map 410 corresponding to physical devices and also LVs, the larger the box (e.g., the larger the area), the greater the associated MAX combined RT value. Thus, relative size of such boxes may be used to visually differentiate which physical devices and LVs have response times which are larger than others (e.g., larger box indicates larger MAX combined RT value). The MAX combined RT values represented by the tree map of 410 may also be appropriately color coded in accordance with a legend of different levels or ranges of response times in a manner similar to the legend as described and illustrated in FIGS. 7 and 8 with respect to utilization. Additionally in the tree map, boxes are located or placed within the tree map based on their relative sizes and thus the response time metrics represented for the physical devices and LVs. The physical device represented by 420 has the largest MAX combined RT value and is located in the upper top left position in the map. The physical device represented by 422 has the smallest MAX combined RT value and is located in the lowest right most position of the map. For boxes corresponding to physical devices, the closer that a box is to the upper left location (e.g., the closer a box is to 420 in either the X or Y direction), the larger the associated MAX combined RT value. For boxes corresponding to physical devices, the closer that a box is to the lower right most location (e.g., the closer a box is to 422 in either the X or Y direction), the smaller the associated MAX combined RT value. In a similar manner, boxes corresponding to LVs are placed within a larger box corresponding to a physical device (e.g. within a physical device represented by box X, those LVs having the largest MAX combined RT values are located closest to the upper most left position within the box X and those LVs having the smallest MAX combined RT values are located closest to the lower most right position within the box X). The foregoing is described in more detail in following paragraphs.

Figure 10A:
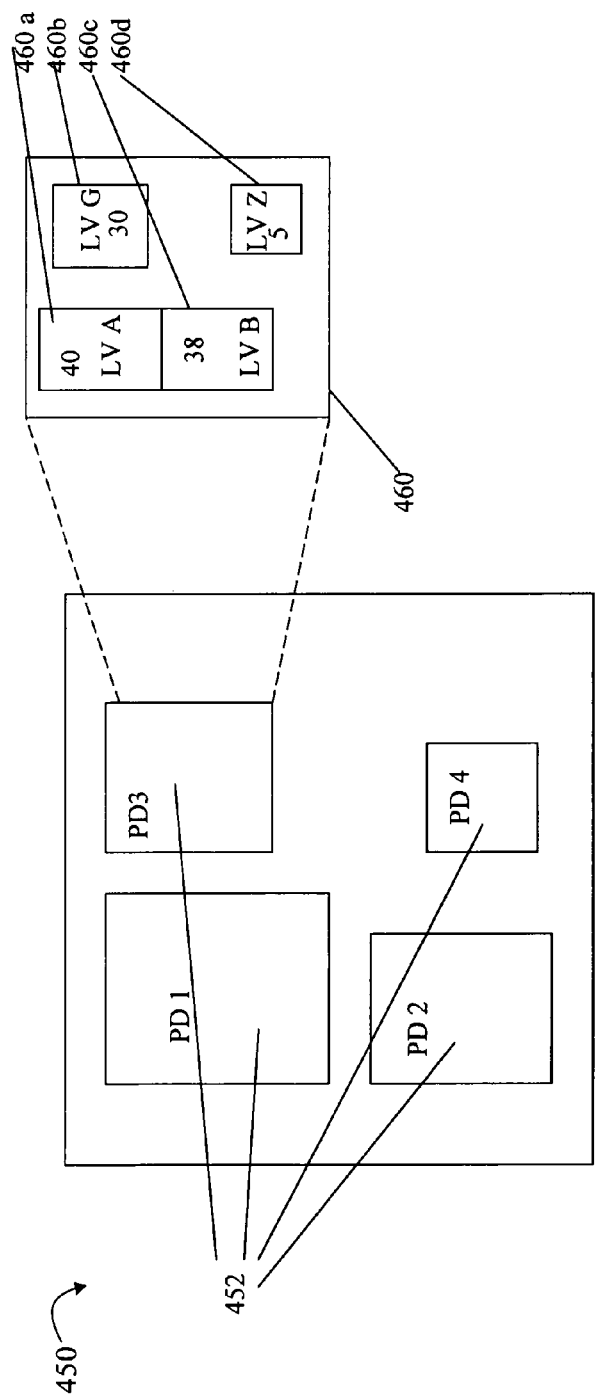

With reference to FIG. 10A, shown for purposes of illustration and explanation is a simplified tree map in accordance with techniques herein. Element 452 identifies those boxes corresponding to physical devices (denoted PDs). Physical device 1 (PD1) has the largest MAX combined RT of all physical devices (e.g., of all 4 physical devices of 452), is larger than all other boxes corresponding to the other physical devices, and is located in the upper left most corner. Physical device 4 (PD4) has the smallest MAX combined RT of all physical devices (e.g., of all 4 physical devices of 452), is smaller than all other boxes corresponding to the other physical devices, and is located in the lower right most corner. Element 460 provides an example illustrating smaller boxes corresponding to LVs having data stored on physical device 3 (PD3). Although only such detail is provided for PD3, each of the other PDs may have similar representations. Within element 460 corresponding to PD3, data from LV A, LV B, LV G and LV Z may be stored on PD3. The following may be the MAX combined RT values for each of the LVs: LV A=40 ms, LV B=38 ms, LV G=30 ms, and LV Z=5 ms. The size and placement of boxes 460a-460d corresponding to each of the foregoing LVs are in accordance with their relative RT values. Each of the elements 460a-460b may also be encoded to provide a visual indication of the MAX combined RT values. For example, the following color coding legend with respect to MAX combined RT values may be used:

Red if MAX combined RT value >35
Orange if 35<=MAX combined RT value <=20
Blue if MAX combined RT value <20.

In this case, elements 460a and 460c may be red, element 460b may be orange and element 460d may be blue.

Figure 10B:
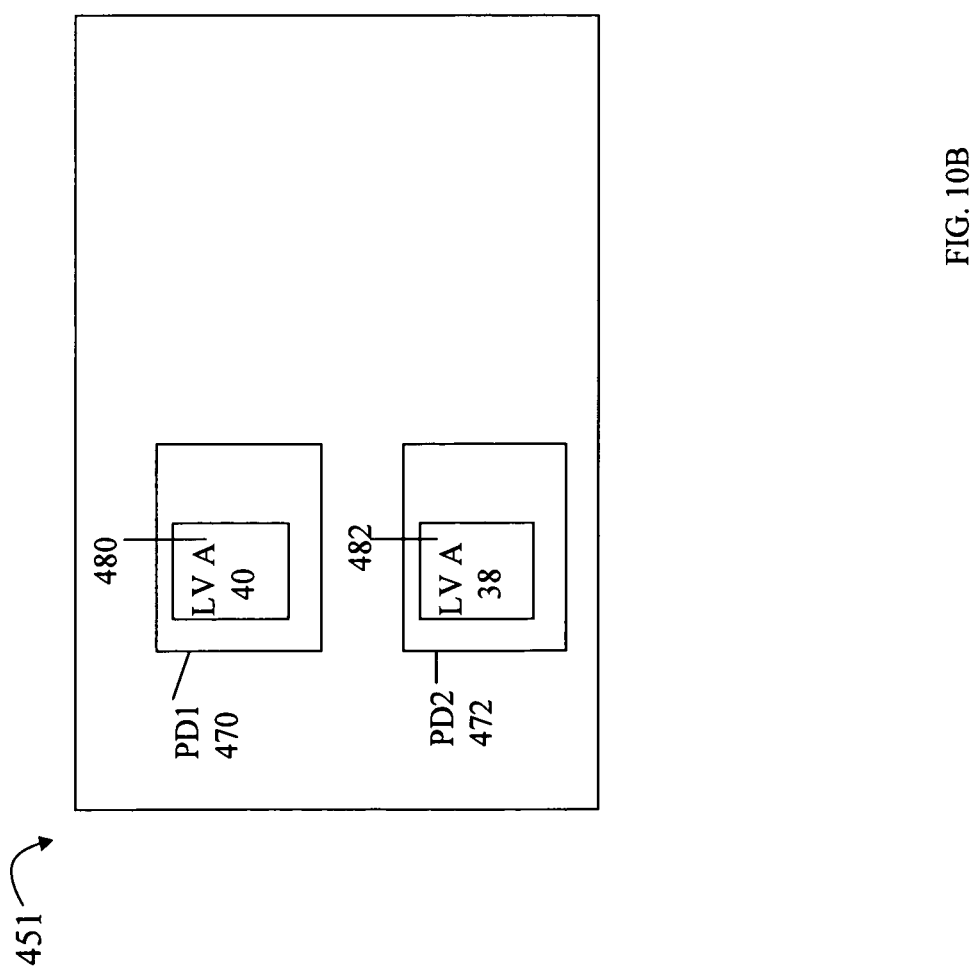

The MAX combined RT for a PD used to determine the placement of the PD's corresponding box within the tree map may be based on I/Os directed to that physical device. Thus, consider, for example, the illustration FIG. 10B of a tree map 451. In FIG. 10B, element 470 represents PD1 and element 472 represents PD2. LV A may have its data located on PD1 and PD2 with a first portion of I/Os for the LV A directed to PD1 and a second portion of I/Os for the LV A directed to PD2. When determining the MAX combined RT for PD1 affecting the placement and size of 470 in the tree map of 451, only I/Os directed to PD1 may be considered. Similarly, when determining the MAX combined RT for PD2 affecting the placement and size of 472 within the tree map 451, only I/Os directed to PD2 may be considered. Element 470 may include a box 480 having a placement and location within 470 determined in accordance with the first portion of I/Os directed to PD1 (e.g., 40 ms may represent the MAX combined RT for I/Os in the first portion). In a similar manner, element 472 may include a box 482 having a placement and location within 472 determined in accordance with the first portion of I/Os directed to PD2 (e.g., 38 ms may represent the MAX combined RT for I/Os in the second portion).

An embodiment may also use different rules which are a variation and simplification to the foregoing when an LV has data located on multiple physical devices. For example, when displaying information (e.g., such as the MAX combined RT) for each LV even when the LV spans multiple physical devices, I/O operations directed to the entire LV may be considered independent of physical device. To further illustrate for the MAX combined RT, both response times for all read and write operations directed to the LV A may be considered. In this case, the value for the MAX combined RT metric may be determined with respect to read and write operations for the LV A directed to both PD1 and PD2. In the tree map, values for the metric displayed and used in connection with 480 and 482 may be the same. Similarly, the values for MAX read RT and MAX write RT for the LV may be determined using, respectively, read operations and write operations directed to all physical devices of the LV. With reference to FIG. 10B and LV A, if the maximum response time for any read and write operations directed to LV A within a period of time is 40 ms, each of 480 and 482 may indicate 40 ms as the MAX combined RT. Furthermore, the value of 40 ms. may be used in connection with determining the location and placement for 480 and 482 within, respectively, 470 and 472. Also when determining the MAX combined RT for each of PD1 and PD2, the same value of 40 ms may be used.

With reference back to FIGS. 9A and 9B, the tree map may be used as a starting point to display MAX combined RT values for the LVs. In other words, in accordance with techniques herein, a user may use the visual representation of the tree map as a starting point to identify an LV rather than the display described in connection with FIG. 3. The tree map may be used to visually display and sort response time metrics (e.g., such as any of MAX combined RT, MAX read RT, and MAX write RT) for LVs and physical devices of a data storage system. The larger a box (e.g. representing a physical device or an LV) included in the tree map, the higher the response time metric. Those LVs and physical devices having larger response times, and thus which may be exhibiting performance problems, are located in the upper top left portion of the tree map (e.g., element 420 of FIGS. 9A and 9B). In accordance with techniques herein, the tree map may be used to display response time metrics and to identify those LVs and/or physical devices having the largest such values. For example with reference back to FIGS. 9A and 9B, a user may select the LV denoted by 421 within the physical device represented by 420. The LV denoted by 421 in this example has a MAX combined RT of 35. Selection of such an LV such as using a mouse pointer in the user interface may result in connection to other user interface menus, displays, options, and the like, providing further information about the performance of the selected LV. For example, selection of the LV 421 may result in display of additional information as described in connection with FIGS. 5 and 6. LV 421 may be made the currently selected or active LV by the LV selection. With reference back to FIG. 5, the user may then select the RT chart tab or LV Workload form tab to display additional information for the LV.

What will now be described are flowcharts of processing steps that may be performed in an embodiment in accordance with techniques herein. The flowcharts of FIGS. 11A, 11B and 12 summarize processing described above.

Figure 11A:
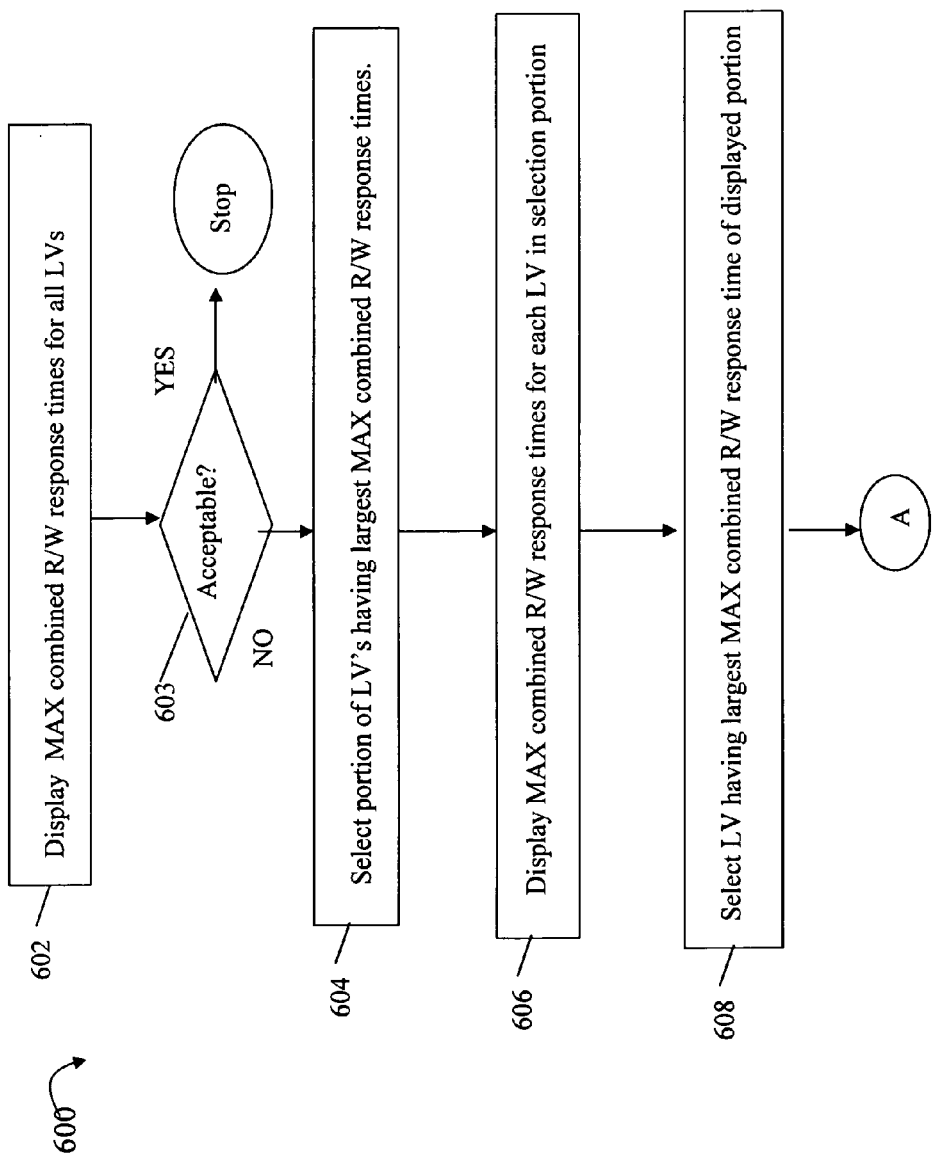
FIGS. 11A, 11B and 12 are flowcharts of processing steps that may be performed in an embodiment in accordance with techniques herein.
Figure 11B:
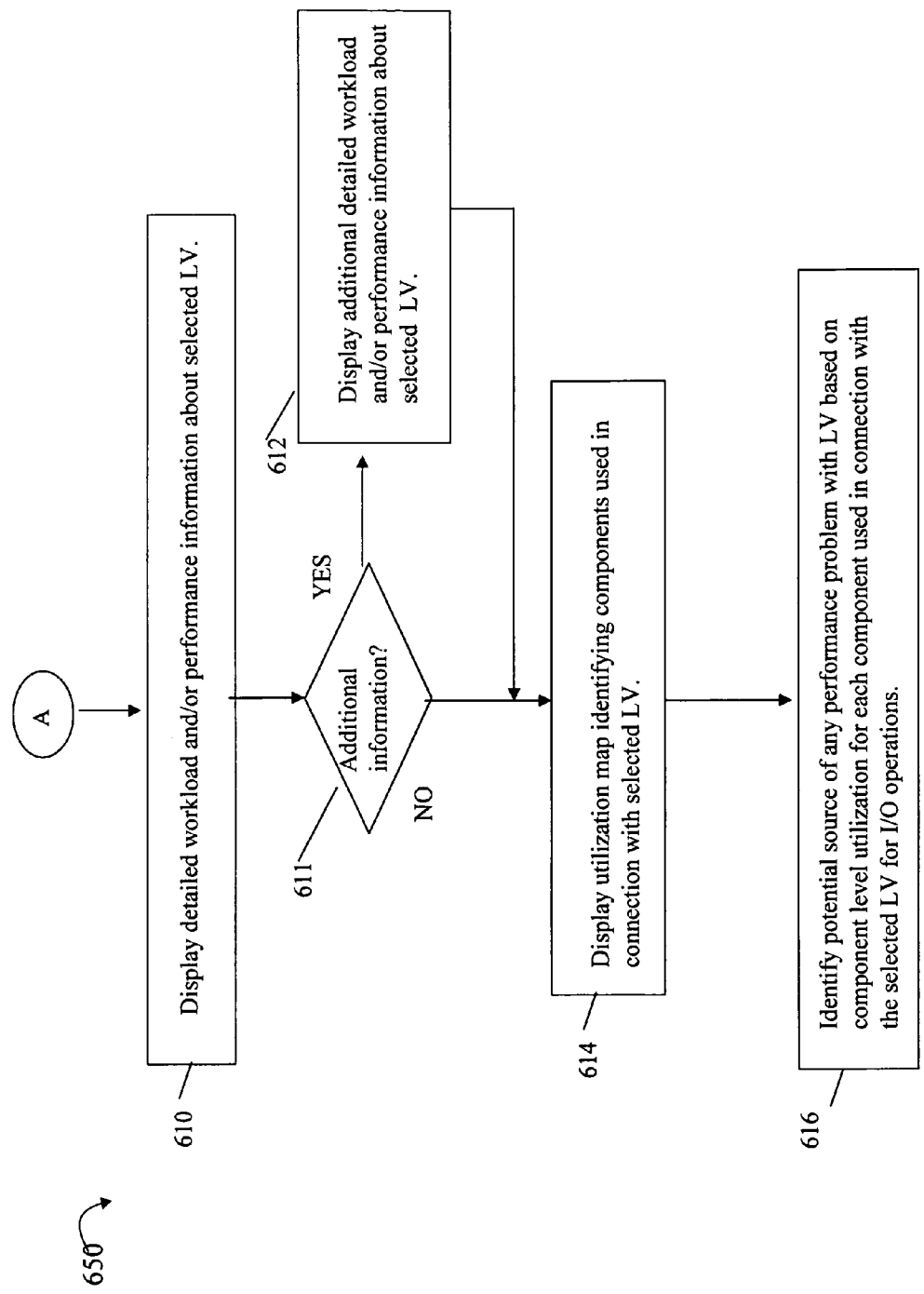

FIGS. 11A and 11B summarize processing described above, for example, in connection with FIGS. 3, 4, 5, 6, 7 and 8. Referring to FIGS. 11A and 11B, at step 602, information regarding one of the MAX RT metrics is displayed for LVs in the data storage system. For example, information may be displayed as described and illustrated in connection with FIG. 3 for the MAX combined RT metric for all LVs in the data storage system. At step 603, a determination is made based on the visual display of information as to whether the displayed information indicates a performance problem. For example, step 603 may include examining the largest of the displayed metrics and determining whether or not that value is above a threshold. If step 603 evaluates to yes, processing stops. If step 603 evaluates to no, control proceeds to step 604. In step 604, a selection may be made of the visually displayed information to select a portion of the LVs having the largest MAX combined RTs. In response to the selection in step 604, the MAX combined RT values for the LVs selected may be displayed. Step 604 and 606 processing is described and illustrated, for example, in connection with FIGS. 3 and 4. In connection with FIG. 3, a portion of LVs represented by 110 is selected (step 604) and, in response, the information of FIG. 4 is displayed (step 606). In step 608, a single LV having the largest MAX combined RT may be selected from those having information displayed in connection with step 604 (e.g., selection of LV using 134 of FIG. 4). In response to the selection in step 608, detailed workload and performance information may be displayed about the selected LV (e.g., information such as that of 162, and 164a-164e of FIG. 5 is displayed). At step 611, a determination is made as to whether additional information for the selected LV is needed. If so, control proceeds to step 612 to display such additional information (e.g., display of information of FIG. 6) From step 612, control proceeds to step 614. If step 611 evaluates to no control proceeds to step 614. At step 614, a utilization map may be displayed identifying components of the data storage system used in connection with the selected LV (e.g., display and use of utilization map of FIGS. 7 and 8). At step 616, any of the utilization map and/or other information displayed for the selected LV may be used in identifying a potential source of a performance problem for the LV. For example, the component level utilization of the components for the selected LV may be used to determine a potential performance problem source. To further illustrate, the utilization map may indicate that the physical device upon which the LV resides has a utilization above an acceptable threshold. In response, the user may conclude that a source of the performance problem initially indicated by a large value for one of the MAX RT metrics (e.g., MAX combined RT, MAX read RT or MAX write RT) is due, at least in part, to the overly utilized physical device. The user may take any number of a corrective actions such as, for example, move the LV data to another device having a lower utilization, add another physical device, and the like.

Figure 12:
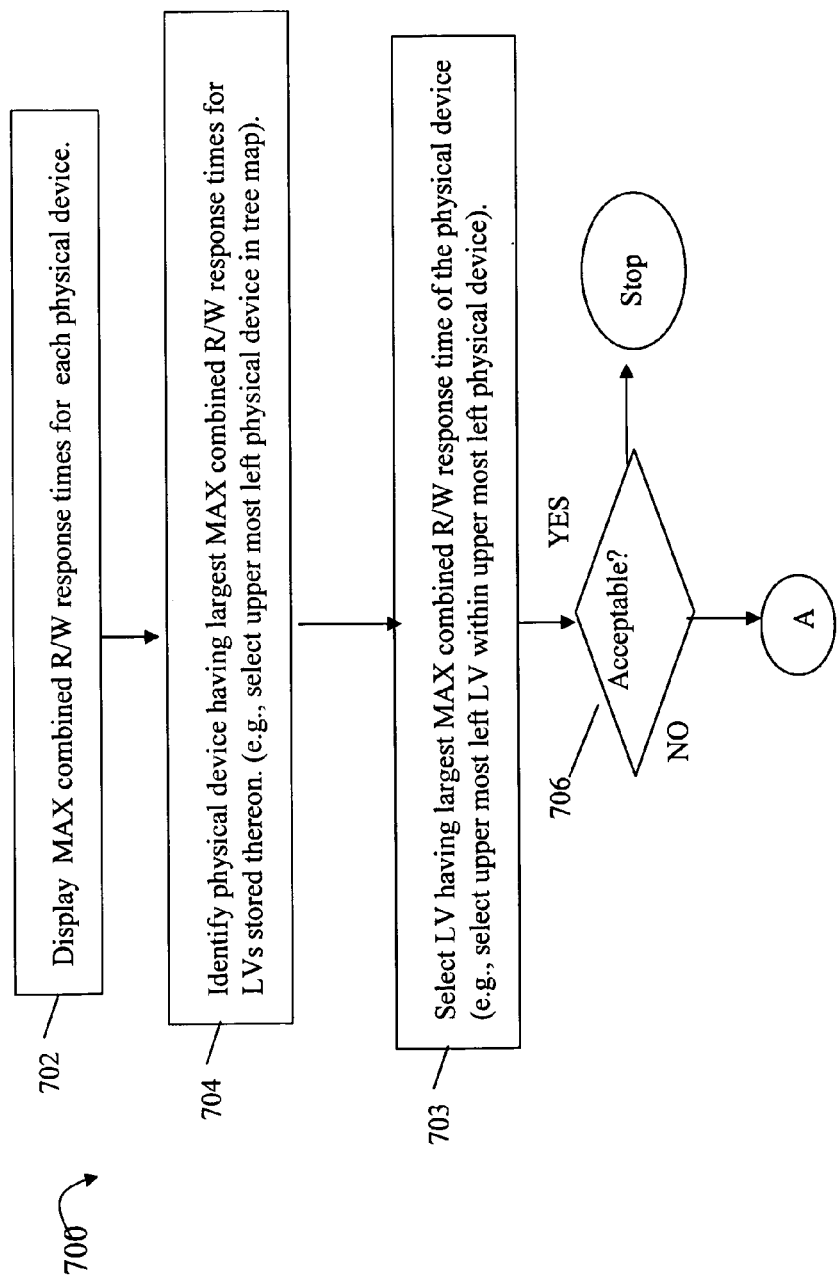

Referring to FIG. 12, shown is an example of a flowchart of processing steps that may be performed in an embodiment in accordance with techniques herein. The flowchart 700 of FIG. 12 summarizes processing, for example, described and illustrated above in connection with FIGS. 9A, 9B, 10A and 10B using a tree map to select an LV exhibiting performance problems. At step 702, a visual representation of the MAX combined RT metric for each physical device and LVs located thereon may be displayed. Step 702 may be performed using a tree map as described, for example, in connection with FIGS. 9A and 9B. It should be noted that the tree map may be used in connection with any of the MAX combined RT, MAX read RT and MAX write RT. At step 704, the physical device having the largest MAX combined RT is identified. Visually, this may be identified as the physical device in the upper left corner of the tree map (e.g. such as 420 of FIGS. 9A and 9B). At step 706 with respect to the physical device identified in step 704, an LV having the largest MAX combined RT metric may be selected. Within a first box of the tree map corresponding to the selected physical device of step 704, the LV selected in step 706 may have a corresponding box located within the first box in the upper left most corner. (e.g. 421 of FIGS. 9A and 9B. At step 706, a determination may be made as to whether the LV selected in step 704 has an acceptable MAX combined RT metric (e.g. whether the value of the MAX combined RT metric for the LV is more than a threshold). If step 706 evaluates to yes, processing stops. Otherwise, control may proceed to step 610 of FIG. 11B.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for identifying a data storage volume exhibiting a performance problem comprising:
   displaying, in a user interface, first information for a plurality of data storage volumes, said first information visually indicating a sorted ordering of a plurality of maximum response times, each of said plurality of maximum response times being a maximum response time within a period of time for a different one of said plurality of data storage volumes;
   selecting, using the user interface, a first of said plurality of data storage volumes having a largest one of the plurality of maximum response times; and
   displaying, in response to said selecting, additional information in the user interface about said first data storage volume, said additional information including at least one workload or performance characteristic of said first data storage volume.

2. The method of claim 1, wherein each of said plurality of maximum response times is a maximum combined response time for read and write operations directed to one of said plurality of data storage volumes.

3. The method of claim 2, wherein said maximum combined response time is a sum of a first response time and a second response time, said first response time representing the largest response time of all read operations directed to said one data storage volume within said period of time and said second response time representing the largest response time of all write operations directed to said one data storage volume within said period of time.

4. The method of claim 1, wherein each of said plurality of maximum response times is a maximum response time for read operations directed to a different one of said plurality of data storage volumes.

5. The method of claim 1, wherein each of said plurality of maximum response times is a maximum combined response time for write operations directed to a different one of said plurality of data storage volumes.

6. The method of claim 1, wherein said user interface is a graphical user interface and said first information is displayed as a graph of said plurality of maximum response times in descending order.

7. The method of claim 1, further comprising:
   selecting, using the user interface, a first portion of said data storage volumes having maximum response times larger than others of said plurality of data storage volumes not selected;
   displaying, in response to selecting said first portion, a second portion of said plurality of maximum response times corresponding to said first portion of data storage volumes; and
   selecting, using the user interface, said first data storage volume from said first portion, said largest one of said plurality of maximum response times being said largest in said second portion.

8. The method of claim 1, wherein said at least one workload or performance characteristic of said first data storage volume relates to any of read hits, read misses, write hits, write misses, total I/Os, I/O size, sequential reads, sequential writes, and prefetched data.

9. The method of claim 1, further comprising:
   displaying, in the user interface, a utilization map indicating component level utilization of components of a data storage system including said plurality of data storage volumes, said utilization map including a visual indication of a portion of said components used in connection with said first data storage volume.

10. The method of claim 9, wherein said first data storage volume is a logical volume and said portion of said components indicated by said visual indication includes at least one front end component and at least one backend component used in connection with said first data storage volume.

11. The method of claim 10, wherein said portion of said components includes a front end component port, a front end component processor, a front end component board, a back end component port, a back end component processor, and a back end component board.

12. The method of claim 10, wherein said portion of said components includes one or more physical devices upon which data of said first data storage volume is located and indicates a portion of global memory or cache.

13. The method of claim 12, wherein said portion includes a plurality of physical devices in accordance with a RAID level of data protection for said first data storage volume.

14. The method of claim 1, wherein said user interface is a graphical user interface and said first information is displayed as a tree map including a plurality of first elements corresponding to physical devices of a data storage system and, within each of said plurality of first elements, a plurality of second elements corresponding to logical data storage volumes, said first data storage volume being one of said logical data storage volumes.

15. The method of claim 14, wherein each of said plurality of first elements and each of said plurality of second elements has a size in accordance with a maximum response time for said time period associated with said each element.

16. The method of claim 15, wherein each of said plurality of second elements included in one of said first elements has a visual indicator indicating a maximum response time for one of said logical data storage volumes having data stored on a physical device corresponding to said one first elements.

17. The method of claim 14, wherein a first physical device having a largest maximum response time of said physical devices is included in an uppermost left location in said tree map and a second physical device having a smallest maximum response time of said physical devices is included in a lowest right location in said tree map.

18. A system comprising:
   a data storage system having a plurality of data storage volumes; and
   a computer system including a computer readable medium having code stored thereon for identifying a data storage volume from said plurality of data storage volumes exhibiting a performance problem, the computer readable medium comprising code for:
     displaying, in a user interface, first information for said plurality of data storage volumes, said first information visually indicating a sorted ordering of a plurality of maximum response times, each of said plurality of maximum response times being a maximum response time within a period of time for a different one of said plurality of data storage volumes;
     selecting, using the user interface, a first of said plurality of data storage volumes having a largest one of the plurality of maximum response times; and
     displaying, in response to said selecting, additional information in the user interface about said first data storage volume, said additional information including at least one workload or performance characteristic of said first data storage volume.

19. A non-transitory computer readable medium having code stored thereon for identifying a data storage volume exhibiting a performance problem, the non-transitory computer readable medium comprising code for:
- displaying, in a user interface, first information for a plurality of data storage volumes, said first information visually indicating a sorted ordering of a plurality of maximum response times, each of said plurality of maximum response times being a maximum response time within a period of time for a different one of said plurality of data storage volumes;
- selecting, using the user interface, a first of said plurality of data storage volumes having a largest one of the plurality of maximum response times; and
- displaying, in response to said selecting, additional information in the user interface about said first data storage volume, said additional information including at least one workload or performance characteristic of said first data storage volume.

20. The non-transitory computer readable medium of claim 19, wherein each of said plurality of maximum response times is a maximum combined response time for read and write operations directed to one of said plurality of data storage volumes, wherein said maximum combined response time is a sum of a first response time and a second response time, said first response time representing the largest response time of all read operations directed to said one data storage volume within said period of time and said second response time representing the largest response time of all write operations directed to said one data storage volume within said period of time.

* * * * *